(12) United States Patent
Salisbury et al.

(10) Patent No.: US 11,272,662 B2
(45) Date of Patent: Mar. 15, 2022

(54) END EFFECTOR FOR ROBOTIC HARVESTING

(71) Applicant: SRI INTERNATIONAL, Menlo Park, CA (US)

(72) Inventors: Curt Salisbury, San Ramon, CA (US); Jacob Suchoski, Shelby Township, MI (US); Rich Mahoney, Los Altos, CA (US)

(73) Assignee: SRI International, Menlo Park, CA (US)

( * ) Notice: Subject to any disclaimer, the term of this patent is extended or adjusted under 35 U.S.C. 154(b) by 79 days.

(21) Appl. No.: 15/532,239

(22) PCT Filed: Dec. 2, 2015

(86) PCT No.: PCT/US2015/063461
§ 371 (c)(1),
(2) Date: Jun. 15, 2017

(87) PCT Pub. No.: WO2016/090012
PCT Pub. Date: Jun. 9, 2016

(65) Prior Publication Data
US 2017/0273241 A1    Sep. 28, 2017

Related U.S. Application Data
(60) Provisional application No. 62/087,096, filed on Dec. 3, 2014.

(51) Int. Cl.
*A01D 46/30* (2006.01)
*A01D 46/00* (2006.01)
*B25J 15/00* (2006.01)

(52) U.S. Cl.
CPC .......... *A01D 46/30* (2013.01); *A01D 46/005* (2013.01); *B25J 15/00* (2013.01)

(58) Field of Classification Search
CPC ...... A01D 46/005; A01D 46/24; A01D 46/30; A01D 46/253
See application file for complete search history.

(56) References Cited

U.S. PATENT DOCUMENTS 2,545,072 A * 3/1951 Denman .............. A01D 46/005
                                                          56/332
3,473,312 A * 10/1969 Holt ..................... A01D 46/005
                                                          56/332
(Continued)

FOREIGN PATENT DOCUMENTS

CN      201682806 U      12/2010
CN      102217461 A      10/2011
(Continued)

OTHER PUBLICATIONS

International Search Report & Written Opinion, PCT/US15/63461, dated Mar. 30, 2016, U.S. International Searching Authority, 12 pp.
(Continued)

*Primary Examiner* — Alicia Torres
(74) *Attorney, Agent, or Firm* — McDonnell Boehnen Hulbert & Berghoff LLP

(57) ABSTRACT

A fruit harvesting system includes a vacuum generating subsystem and an end effector connected to the vacuum generating subsystem. The end effector has a first tube having a first diameter, and a second tube having a second diameter smaller than the first diameter so the second tube fits inside the first tube. A fruit harvesting system includes a vacuum generating subsystem, a tube connected to the vacuum generating subsystem and at least one structure coupled to an inside of the tube. A fruit harvesting system includes a vacuum generating subsystem, a first tube connected to the vacuum generating subsystem, and a second tube coupled to the first tube, the second tube having a tubular portion coupled to the first tube in an orientation (Continued)

other than parallel, the second tube having openings on opposite sides of the first tube.

18 Claims, 27 Drawing Sheets

(56) References Cited

U.S. PATENT DOCUMENTS

| | | | |
|---|---|---|---|
| 3,559,387 A | 2/1971 | Myers | |
| 3,591,949 A * | 7/1971 | Connery | A01D 46/005 |
| | | | 56/332 |
| 3,664,104 A | 5/1972 | Jamshidi | |
| 4,014,440 A * | 3/1977 | Millier | A01D 46/24 |
| | | | 414/612 |
| 4,558,561 A * | 12/1985 | Mendenhall | A01D 46/005 |
| | | | 56/327.1 |
| 4,674,265 A | 6/1987 | Gerber | |
| 7,540,137 B2 | 6/2009 | Gray | |
| 7,810,305 B2 * | 10/2010 | Macidull | A01D 46/247 |
| | | | 56/333 |
| 2005/0126144 A1 | 6/2005 | Koselka et al. | |
| 2008/0010961 A1 * | 1/2008 | Gray | A01D 46/30 |
| | | | 56/10.2 A |
| 2008/0279640 A1 | 11/2008 | Bryan, Jr. et al. | |
| 2010/0064653 A1 * | 3/2010 | Dietrich | A01D 46/005 |
| | | | 56/328.1 |
| 2011/0047951 A1 * | 3/2011 | Moore | A01D 46/24 |
| | | | 56/234 |
| 2011/0047955 A1 | 3/2011 | Dietrich et al. | |
| 2012/0096823 A1 | 4/2012 | Moore | |

FOREIGN PATENT DOCUMENTS

| | | |
|---|---|---|
| WO | 2008/008972 A2 | 1/2008 |
| WO | 2010085450 A1 | 7/2010 |

OTHER PUBLICATIONS

International Search Report and Written Opinion issued in co-pending International Patent Application No. PCT/US2017/052404, ISA/US, dated Nov. 30, 2017, 14 pages.

* cited by examiner

END EFFECTOR FOR ROBOTIC HARVESTING

RELATED APPLICATION

This application is a continuation of, and claims priority to, U.S. Provisional Application No. 62/087,096, filed Dec. 3, 2014, "End Effector for Robotic Harvesting."

BACKGROUND

Fruit plucking and harvesting remains a largely manual process. In a fruit orchard in which fruit grows on trees, such as apples, pears, apricots, peaches, etc., a farm laborer may move a ladder near a tree, climb the ladder, pluck the fruit, and transfer the fruit to a temporary storage like a basket. After the worker has plucked all of the ripe fruit in that location, the worker climbs down and moves the ladder to another location, then repeats the process as many times as necessary. The process has high labor requirements, which results in high costs of operation, lowering profits made by the farmers.

Relying on manual labor may also have other undue risks. These risks include the risk of illness or other unavailability of the workers, affecting the labor supply. Additionally, the lack of untrained workers can lead to careless or mishandling of the fruit. While picking fruit seems to require workers of low skill and training, a skilled farm worker may pluck as many as 2 fruits per second with relatively low losses due to damage. Untrained workers may work significantly slower, and may cause much higher losses due to damaged fruit. The cost of training workers may contribute to significant cost increases in operation of the farm.

Another factor contributing to the instability of the fruit harvesting work force lies in changing legal and demographic trends. These trends reduce the availability of immigrant laborers that make up the primary source of farm workers. The aging US population creates competition for this type of labor across several industries, a further disadvantage to the operation of the farms. This has led to an interest in mechanized systems for picking fruit.

Mechanized systems have their own issues related to positioning of the end effector that actually plucks the fruit. Mis-positioning of the end effectors can damage the fruit, lowering the output of the farms, but using mechanical systems overcomes the need to train new pickers. The need exists for mechanical systems that do not require highly accurate positioning.

DETAILED DESCRIPTION OF THE EMBODIMENTS

Figure 1:
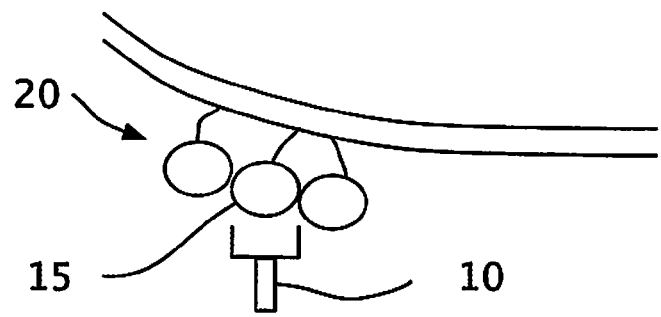
FIG. 1 shows a prior art harvesting system using a gripper.
Figure 2:
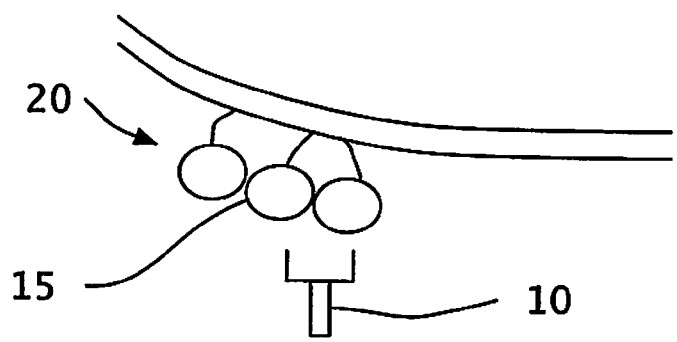
FIG. 2 shows an example of a mis-positioned harvesting system.

FIGS. 1 and 2 illustrate a typical prior art system of plucking fruit using a harvesting system with a gripper. FIG. 1 shows gripper 10 positioned accurately and precisely in the vicinity of a targeted fruit 15 growing in a cluster 20 of fruits. Once positioned accurately, the gripper may advance towards the targeted fruit. Advancing the gripper, if not performed carefully, may result in the neighboring fruits being dislodged from the tree. FIG. 2 shows an example of why accurate positioning is important in typical current systems. The gripper 10 has some positional inaccuracy. If the gripper advances with this inaccuracy in positioning, it may damage both the targeted fruit 15 and its neighbor. The need for accuracy may result in a less efficient and more time-consuming process.

Currently available grippers generally are mechanical or electromechanical in nature. An example of a purely mechanical gripper consists of a jaw at the end of a long pole; the jaw may be able to grasp the fruit and detach it from the tree. Grippers may also be vacuum based. In a typical vacuum based system a vacuum tube may be coupled to a suction cup at its extremity. The suction cup may be brought close to the fruit and due to the vacuum, the fruit may become detached from the tree and adhere to the suction cup. The suction cup and tube may then be placed over a container or a conveyance system where the fruit may be released from the suction cup by releasing the vacuum. An inherent challenge in the suitability of suction cups for picking fruit is the ability to create an air seal between the suction cup and the fruit.

These types of harvesting techniques, the mechanical gripper or jaw and the vacuum based suction system, may be thought of as "pick and place" techniques. The system picks the fruit at one location and places it at another location. Pick and place system have inherent inefficiencies due to the time it takes to do both the picking and placing. These methods cost additional time of releasing the fruit from the end-effector.

Figure 3:
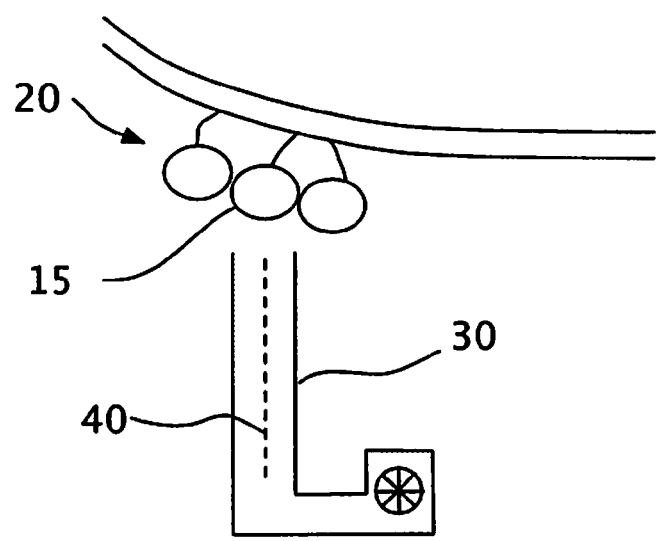
FIG. 3 shows an embodiment of a vacuum based harvesting system.
Figure 4:
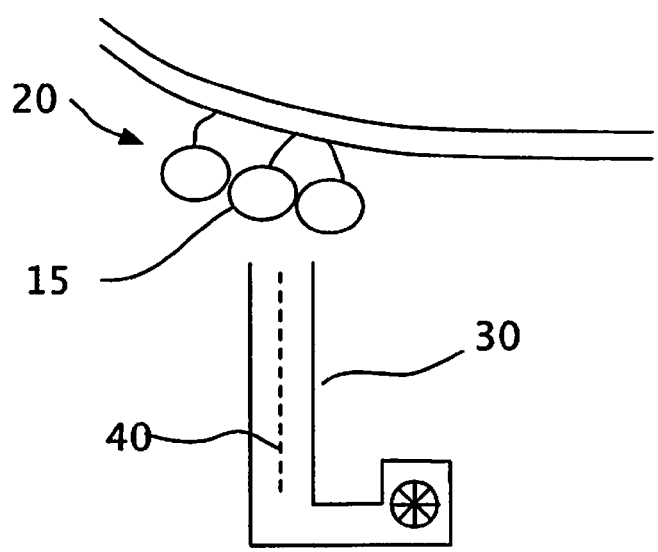
FIG. 4 shows an embodiment of a vacuum based harvesting system having mis-positioning.

FIGS. 3 and 4 show an overview of a vacuum based harvesting system. FIG. 3 shows the vacuum based system 30 shown in the vicinity of the targeted fruit 15. This system will be described in more detail below. One advantage of this system lies in little or no required physical contact between the plucking system and the fruit before or during the process of plucking. This minimizes or removes the risk of injury to the fruit while plucking.

FIG. 4 shows a second advantage in which the requirement for accurate positioning of the vacuum system has lessened. In FIG. 4 shows the vacuum system with a positional inaccuracy with respect to the targeted fruit 15. Observations suggest that such inaccuracies still result in successful plucking operation. The system may tolerate inaccuracies within reasonable limits, such as having the vacuum axis less than a radius of the apple away from core of the apple, or other measures applied to other types of fruit. Advantages of the vacuum based system include higher efficiency in terms of the rate at which fruits may be plucked.

FIGS. 1 and 2 illustrate systems that pull or grab the fruit from the bottom, which may oversimplify the complex harvesting process. The discussion now turns to a brief description of how a fruit may be attached to a tree to provide background for the detailed concepts of the harvesting system. This brief description involves apples with the help of FIG. 5. However the description may commonly apply to other fruits such as but not limited to pears and other stemmed fruits.

Figure 5:
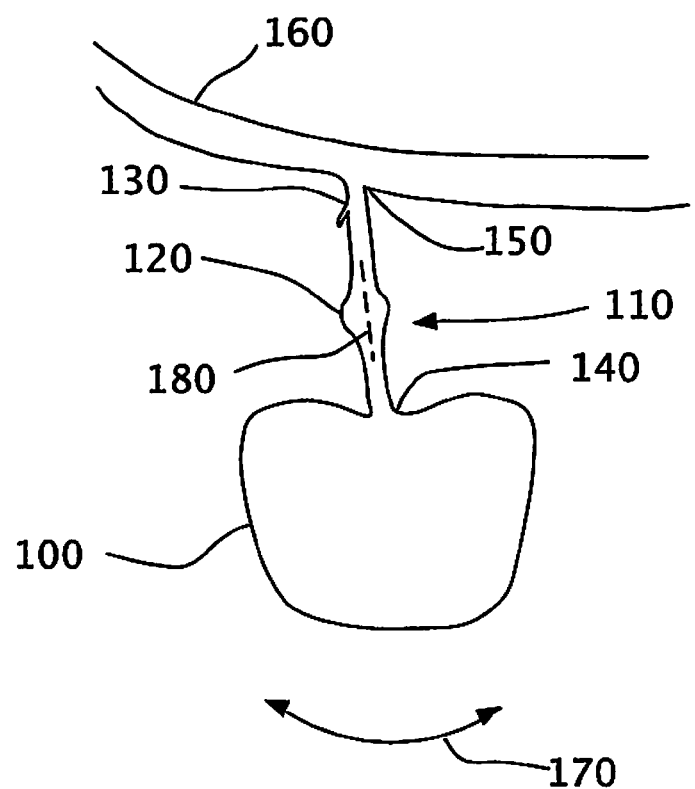
FIG. 5 shows an illustration of an apple.

Referring to FIG. 5, a tree branch 160 has an apple 100 attached by a stem 110. The section 150 where the apple grows from the branch is called a spur pull. The spur 130 grows in this section. The spur is also the section that supports next season's apple. Damage to the spur may result in an apple not growing from this section next season. Further down the stem the abscission 120, illustrated as a bulge, may be composed of fibers. As the apple ripens, these fibers can no longer hold the weight of the apple, causing the apple to fall. It is generally known within the agricultural community that the least harmful way to pluck or harvest an apple separates it from the stem at the abscission. Even further down on the stem of the apple, the stem attaches to the apple in the vicinity of 140, called the stem pull. While harvesting or plucking the apple, a common practice ensures that skin of the apple around the stem pull area suffers no damage. Damage to this area provides a pathway for pathogens to enter the fruit and cause rapid rotting.

Given the above discussion, detaching the fruit at the abscission has several advantages. This detachment does not harm the fruit being plucked, does not endanger next season's crop, and takes advantage of the way apples detach naturally. Furthermore, given the orientation of the fibers at the abscission, an effective way to detach the apple twists the apple at an angle to the stem direction. One such effective direction is illustrated in FIG. 5 by arrow 170. Other directions are possible such as out of the plane of the paper. Any direction may result in successful detachment as long as the motion creates an angle to the longitudinal axis 180. Pulling or twisting about the axis of the abscission without angling may also be successful. But it has been observed that this way of detachment is more difficult, may require more energy, and may result in damaging the apple. The longitudinal arrangement of the fibers along the stem may prevent efficient separation by pulling or twisting along the axis without angling. Therefore, fruit pickers tend to twist or apply an angle to the fruit about the abscission.

Figure 6:
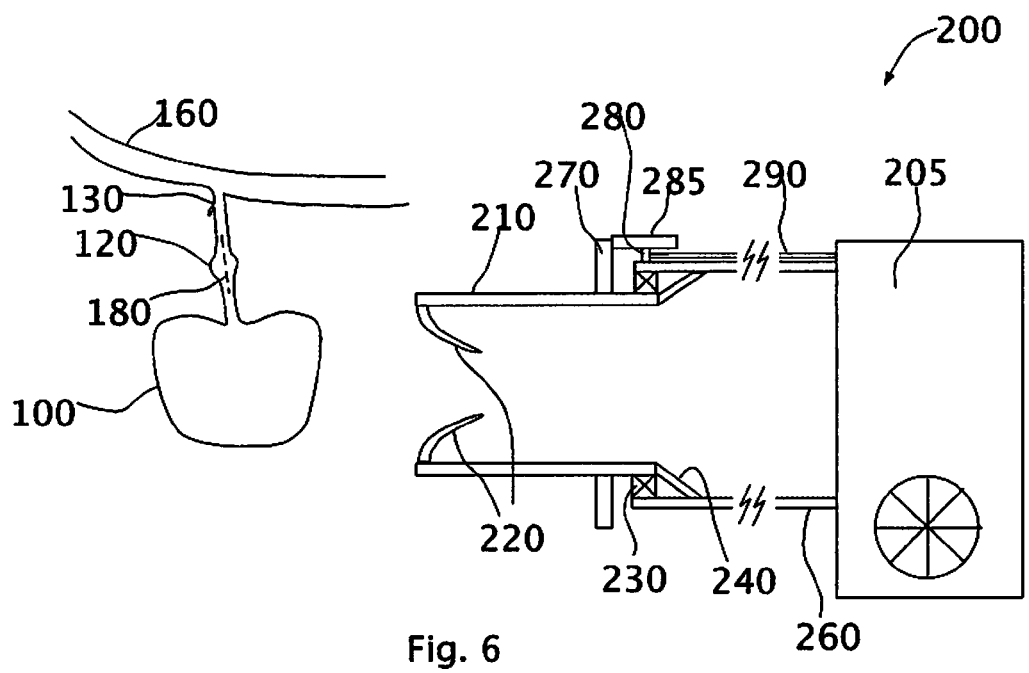
FIG. 6 shows an embodiment of a vacuum based harvesting system.

Based on these observations, a mechanical or an electro-mechanical system for harvesting the fruit may advantageously detach the fruit at the abscission by applying an angle to the fruit relative to the abscission axis. Many of the embodiments below use a vacuum based end effector while applying an angle to the targeted fruit relative to the abscission axis. FIGS. 6-10 describe some of these concepts. FIG. 6 shows harvesting system 200 having a vacuum based end effector that may apply a twist at an angle to the abscission axis. The system 200 generally may be composed of two tubes 210 and 260. The tube 210 may rotate on the inside diameter of the tube 260, which may remain stationary and coupled to the vacuum generating subsystem 205.

Bearing 230 between the outside diameter of tube 210 and the inside diameter of tube 260 may provide the rotational surface upon which be 210 may rotate. The arrangement of the bearing between the two tubes may provide sufficient structural support for the inside tube 210. Other structural support structures may ensure that the inside tube 210 may rotate stably within the outside tube 260. To prevent loss of vacuum, a rotatable seal 240 may be provided. The seal may couple immovably to the end of the inside tube 210 as shown and may rotate with minimal or no clearance against the inside diameter of tube 260. Although some vacuum may be lost, this seal may preserve a significant portion of the vacuum. Other methods of sealing are possible but not shown.

Rotation of the tube 210 may occur in the following way. The tube 210 may have a gear 270 coupled to its outside diameter which may mesh with gear 285. Gear 285 may couple to an axle 280. A motor (not shown) may drive a belt 290, which in turn may drive gear. In this configuration, the tube 210 may rotate.

Figure 7:
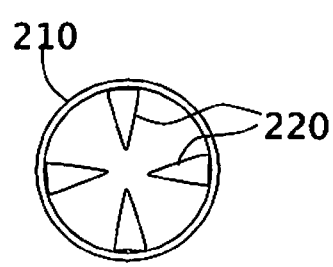
FIGS. 7-9 show illustrations of methods to loosely harvest fruit with a rotation.

FIGS. 6 and 7 show yet another feature. In FIG. 6 shows, at the distal end of the tube 210, flexible projections 220. These couple immovably to the inside diameter of the tube 210 and can rotate as a group as the tube 210 rotates. FIG. 7 shows the end-on view of the distal end of the tube 210. These projections may bend inwards as shown in FIG. 6 if a load is applied to their outside surface, where the outside surface consist of the surfaces facing the fruit in FIG. 6. These projections may consist of any flexible and soft material such as but not limited to rubber and soft plastic.

In operation, when the vacuum generation subsystem turns on and the entire system 200 moves close to the targeted fruit, the fruit may swing towards the tube 210. As the tube 210 contacts the fruit, the flexible projections may loosely capture the fruit. If the flexible projections rotate, the fruit may also rotate along with the flexible projections. This combination of the vacuum force and a twisting force at an angle to the abscission axis applied to the fruit then may lead to detachment from the stem at the abscission.

Figure 8:
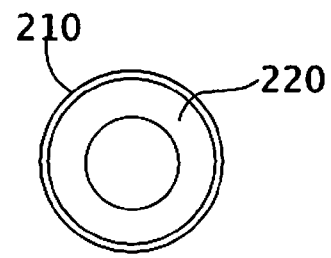

The distal end of the tube 210 may have one of several figures to achieve application of rotational force. FIG. 8 shows another embodiment where, instead of the individual projections shown in FIG. 7, member 220 may consist of a flexible plate capable of bending inwards. FIG. 6 shows the profile of member 220 after bending. Similar to the individual projections in FIG. 7, the flexible plate may consist of materials such as but not limited to rubber and soft plastic.

Figure 9:
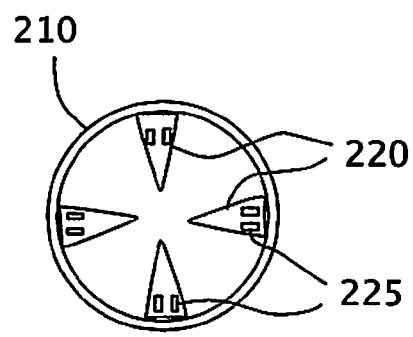

In another variation, the individual projections illustrated in FIG. 7 or the continuous plate illustrated in FIG. 8 may have one or more pairs of electrodes 225 as shown in FIG. 9. An appropriate voltage applied across the electrode pairs may create an electroadhesive force between the electrode pair and the fruit, allowing the fruit to be attracted to the electrodes. U.S. Pat. No. 7,551,419, assigned to SRI International, explains the principles of electroadhesion in detail. One must note that these electrodes may couple to the flexible plate 220 illustrated in 9 as well.

Figure 10:
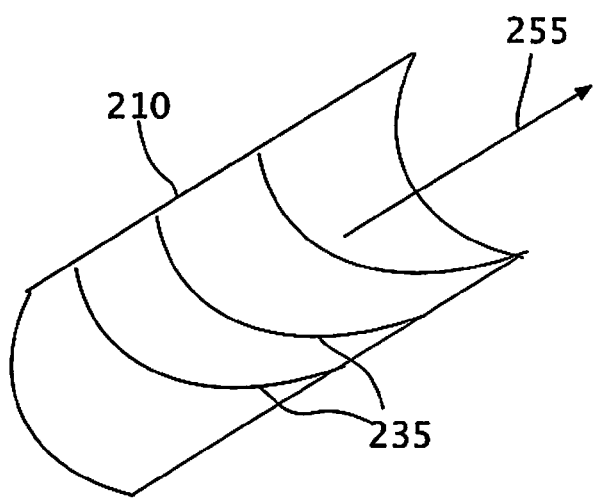
FIG. 10 shows an embodiment of an inner tube having ribs.

Referring back to FIG. 6, various methods other than that illustrated in the Figure may cause rotation of the inner tube 210. FIG. 10 illustrates another method. FIG. 10 shows a perspective view of a cut section of the tube 210. The inside diameter of this tube may have ribs as illustrated by 235. Upon application of a vacuum in the direction 255, the tube may rotate about its longitudinal axis. The ribs may consist of low height projections and made of soft material such that minimal or no damage to the fruit is incurred as it is pulled into the tube by the vacuum.

Figure 11:
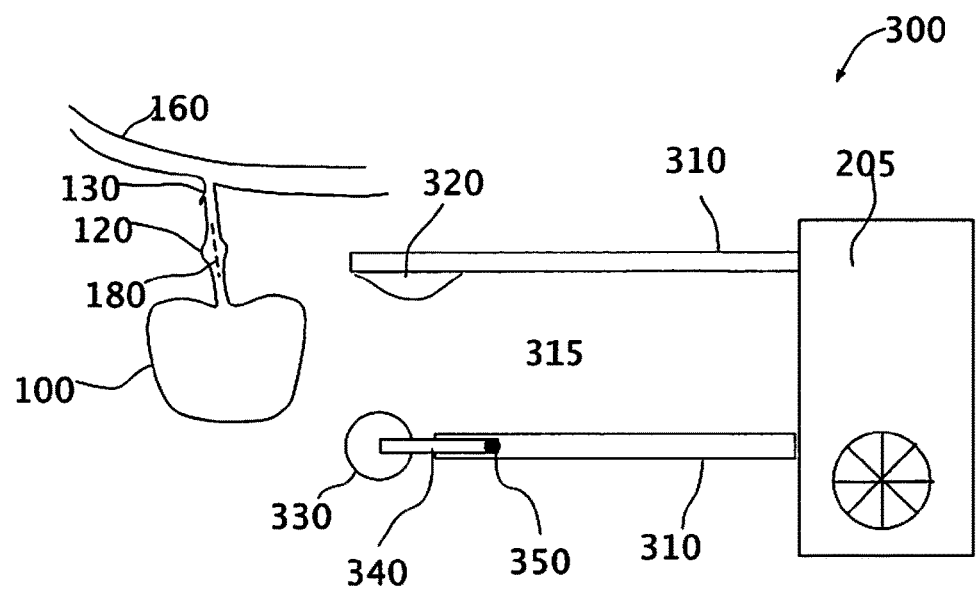
FIGS. 11-12 show an embodiment of a vacuum based harvesting system with a hard surface and a rotating wheel and its operation.

FIG. 11 shows another concept for imparting a twist at an angle to the abscission axis. FIG. 11 shows another fruit plucking system 300 having a vacuum based end effector. The end effector consists of tube 310 on either side of a gap. The gap 315 may essentially form another tube. On one side of the upper tube 310 at the distal end of the system 300, a projection 320 may couple immovably to the inside diameter. This projection may be stiff and made of materials such as but not limited to hard plastic and may have a high coefficient of friction. On the opposite side, a freely rotating wheel 330 may couple to a support structure 340 and the lower tube 310 such that the support structure and the wheel rotate about pivoting joint 350. In addition, the pivot joint 350 may be spring loaded and biased in such a way that with no external force, the wheel and support structure may return to the position shown.

Figure 12:
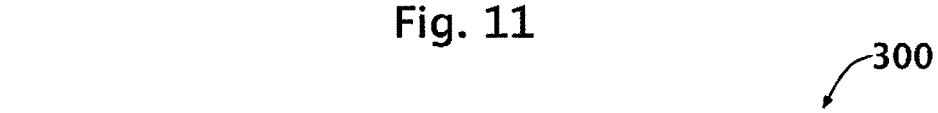

FIG. 12 shows the operation of this system. As the system 300 contacts the fruit, vacuum pulls the fruit towards the tube. However the hard projection 320, which may have a high coefficient of friction, may prevent the fruit from moving inwards into the tube unimpeded on this side. On the diametrically opposite side, the freely rotating wheel 330 along with the support structure 340 swivels out of the way (downwards as illustrated in the Figure). The difference in the forces experienced on either side of the fruit causes it to tilt at an angle to the original abscission axis 180. FIG. 12 shows the axis 180 in its original orientation to illustrate the angle more clearly. This type of figure causes a differential force that may facilitate the detachment of the fruit at the abscission.

Figure 13:
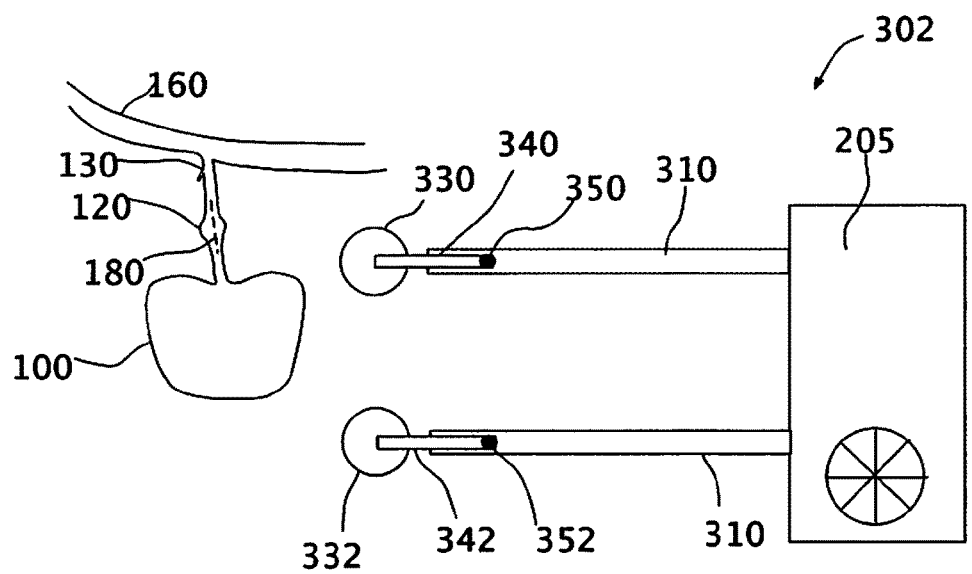
FIGS. 13-14 shows an embodiment of a vacuum based harvesting system with two rotating wheels and its operation.
Figure 14:
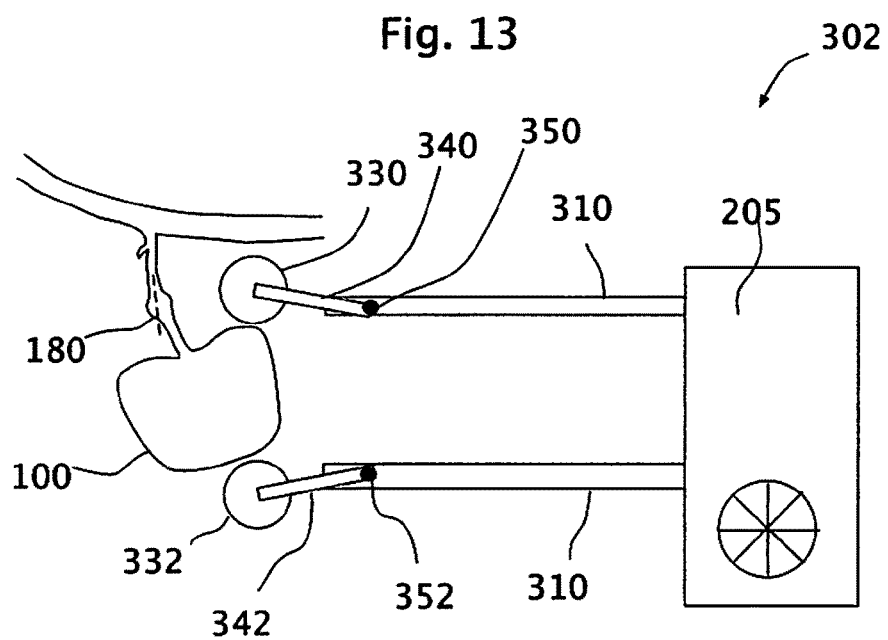

FIGS. 13 and 14 show another concept of vacuum based end effector that causes a twist at an angle. In this example, two wheels 330 and 332 are coupled by support structures 340 and 342 to the tube 310. The support structures may be capable of pivoting about 350 and 352. As described earlier in reference to FIGS. 11 and 12, the pivot joints may be spring loaded and biased in such a way that at rest, the wheels and support structures attain the position shown in FIG. 13. In addition, the two wheels may have different rolling resistances. For example wheel 332 may be freely rotating but wheel 330 may not rotate as freely. In operation, as the vacuum pulls the fruit into the tube 310, the differential rolling resistance of the two wheels may cause at angle to the abscission axis, subsequently causing detachment of the fruit.

Figure 15:
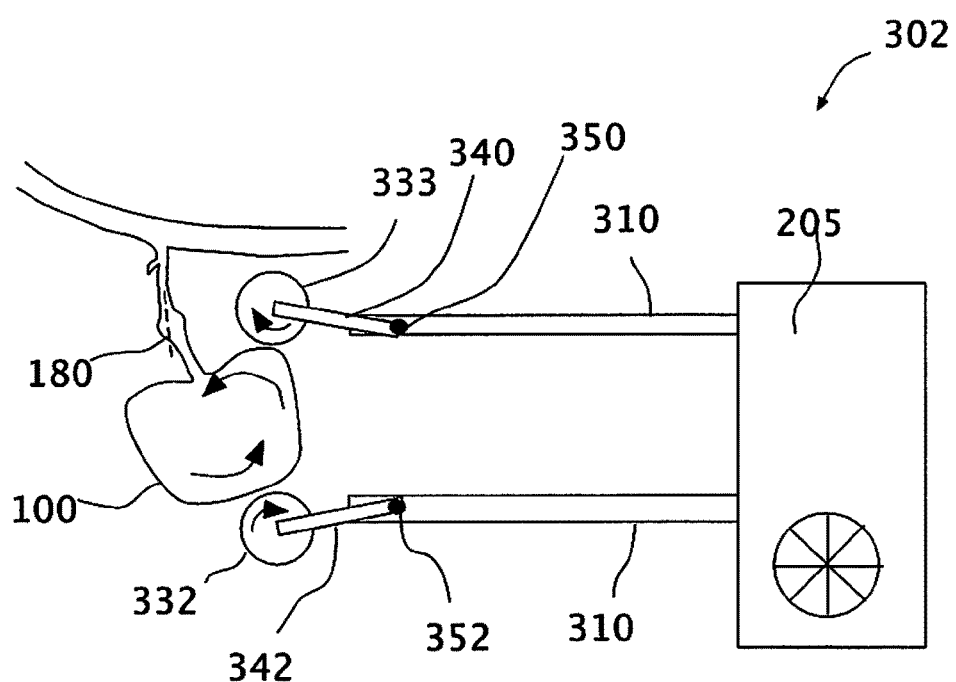
FIG. 15 shows an embodiment of a vacuum based harvesting system with a driven wheel and a rotating wheel.

FIG. 15 shows yet another concept of a vacuum based end effector that may impart a twist at an angle to a piece of fruit. The figure in FIG. 15 is similar to FIG. 14 except in this case, wheel 333 in FIG. 15 has replaced wheel 330 of FIGS. 13 and 14. Wheel 333 of FIG. 15 may be a driven wheel, where wheel 332 may be a freely rotating wheel. Wheel 333 may be driven in the direction of arrow illustrated within that wheel, and the freely rotating wheel 332 may be rotating in the direction shown within that wheel. This type of arrangement results in the fruit experiencing an angle with respect to the original abscission axis 180 while detaching from the stem.

Figure 16:
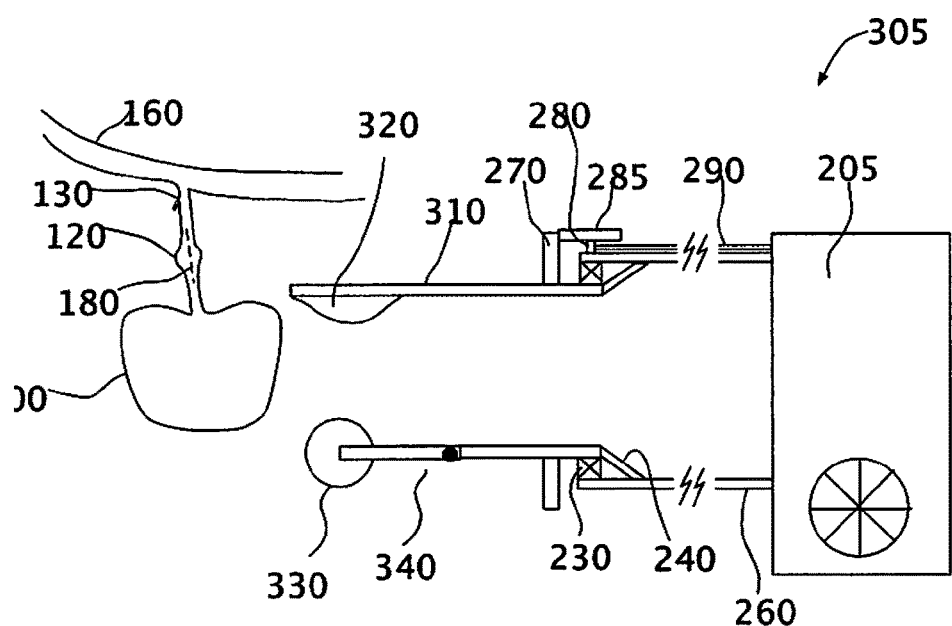
FIG. 16 shows a rotating end effector for a vacuum based harvesting system.

FIG. 16 shows another variation combining the embodiments shown in FIGS. 6-10 and 11-15. Here the tube 310 of FIGS. 11-15 may be made to rotate as in FIGS. 6-10. As explained before, various mechanisms may cause the tube to rotate the tube however the same mechanism illustrated in FIG. 6 is illustrated in FIG. 16 as well. It also must be noted that although FIG. 16 shows a hard projection 320 on one side of the tube and a freely rotating wheel on the other side of the tube, any of the various mechanisms described that impart a twist or rotation to the fruit may be utilized.

The figure illustrated in FIG. 16 may have advantages when plucking fruits that may grow in bunches. The angular orientation of each fruit while growing in a bunch may differ. Having the capability to rotate the end effector while also imparting a twist or rotation to the fruit may help in accommodating the various orientations.

Figure 17:
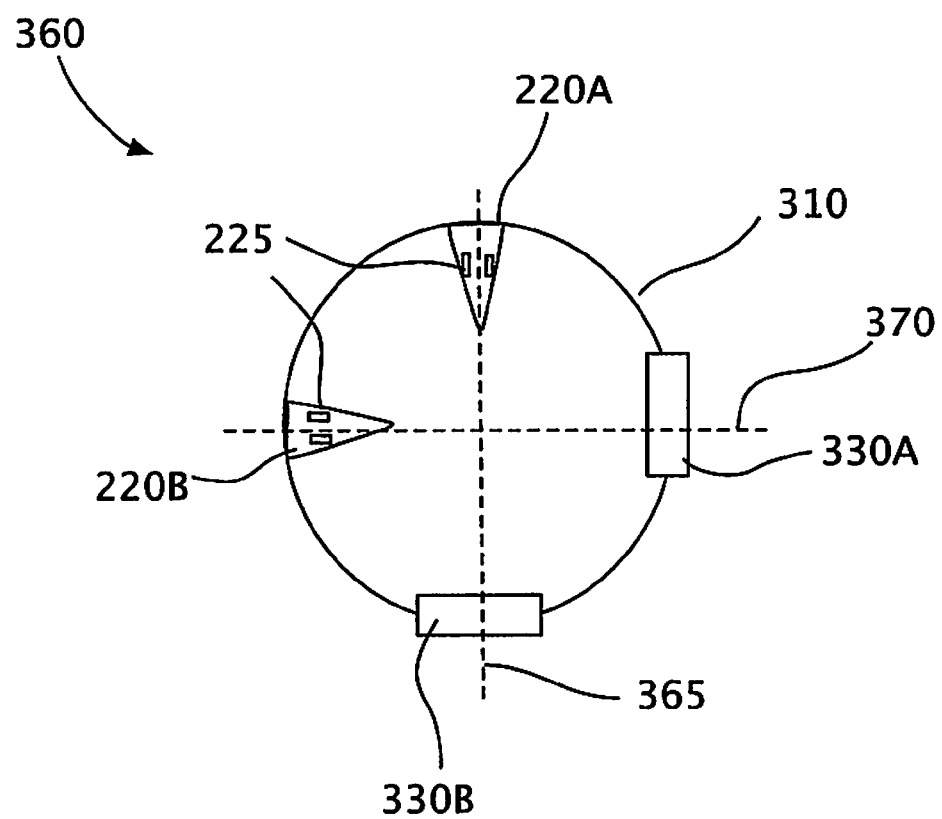
FIG. 17 shows an end effector that uses electro-adhesion.

FIG. 17 shows another variation that may accommodate the various orientations of fruits growing in a bunch. This Figure shows an end-on view of the vacuum tube 310. The Figure shows a combination of end effectors. End effectors 220A and 220B are of the type of end effector 220 shown in FIGS. 7 and 9, described previously as flexible projections. Each flexible projection is shown coupled to a pair of electrodes 225. More than one pair of electrodes may be coupled to each flexible projection. End effectors 330A and 330B are of the type of end effector 330 illustrated in FIGS. 11 and 12, described previously as freely rotating wheels. The electrodes 220A and 220B may be supplied with electricity such that when a specific pair, either 220A or 220B for example, is turned on, electroadhesive force may be experienced by a body such as a fruit in contact with that pair. Depending on the orientation of the fruit, either the electrode pair coupled to flexible projection 220A is turned on or the electrode pair coupled to flexible projection 220B is turned on. Whichever pair is tuned on, the flexible projection associated with that pair provides a high friction surface to the fruit.

The high friction surface experienced at that flexible projection along with the low resistance experienced by the freely rotating wheel opposite that flexible projection, causes the fruit to twist and rotate preferentially. If the electrode pair coupled to flexible projection 220A is activated, then the fruit may preferentially twist or rotate at an angle to an axis 365 with the trajectory of the fruit following a path into the tube 310. Similarly, if the electrode pair coupled to flexible projection 220B is activated, then the fruit may preferentially twist or rotate at an angle to an axis 370 with the trajectory of the fruit also following a path into the tube 310. Thus by activating one or the other pair, the various orientations of the fruit may be accommodated.

The concept illustrated in FIG. 17 may be extended in various ways. In one variation, if a flexible projecting and a freely rotating wheel are considered a "set", more than two sets may be coupled to the vacuum tube 310. In another variation, different voltages may be applied to each set of electrodes so that a varying amount of friction may be experienced by the fruit at each different flexible projection. Even with only two sets of flexible projection and freely rotating wheel combination, the fruit may twist or rotate at any angle, depending on the voltage applies to each set of electrodes. In another variation, driven wheels, such as wheels 333 described in relation to FIG. 15 may replace the flexible projections. By selectively driving a specific wheel or by driving the wheels differently such that varying amounts of rolling resistance may be experienced at the surface of each driven wheel, the fruit may be caused to twist and rotate at any desired angle. The fruit orientation may be accommodated with one or a combination of mechanisms described above.

Figure 18:
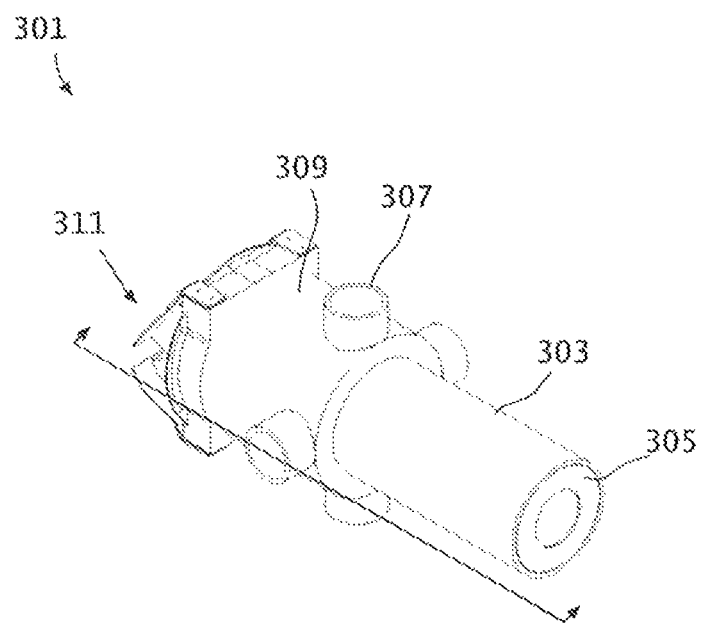
FIGS. 18-21 show another embodiment of an end effector.
Figure 19:
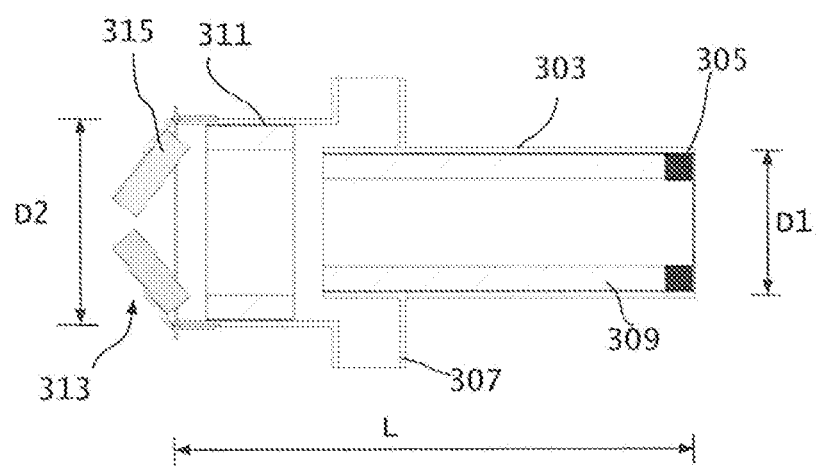

FIGS. 18-21 show another embodiment of an end effector 301. The end-effector shown in FIG. 21 may consist of a rigid tube 303 which may be straight, a vacuum source coupled to the proximal end of the rigid tube, and a nozzle 305 at the distal end of the rigid tube whose purpose and design is to shape and scale the airflow in front of and around the nozzle. FIG. 19 shows a cross-sectional view of the end-effector along plane A-A'. The rigid tube may couple into an intermediate tube which may have a larger diameter to allow for air flow as explained later below. Vacuum ports such as 307 may be provided near the junction of the rigid tube 303 and the intermediate tube 311. This Figure also provides general dimensions of the various components of the end-effector—dimension L may be 18 inches, outer diameter D1 may be 5 inches and outer diameter D2 may be 7 inches. Other dimensions are not excluded. Although four vacuum ports are shown, fewer or more tubes may be utilized.

Figure 20:
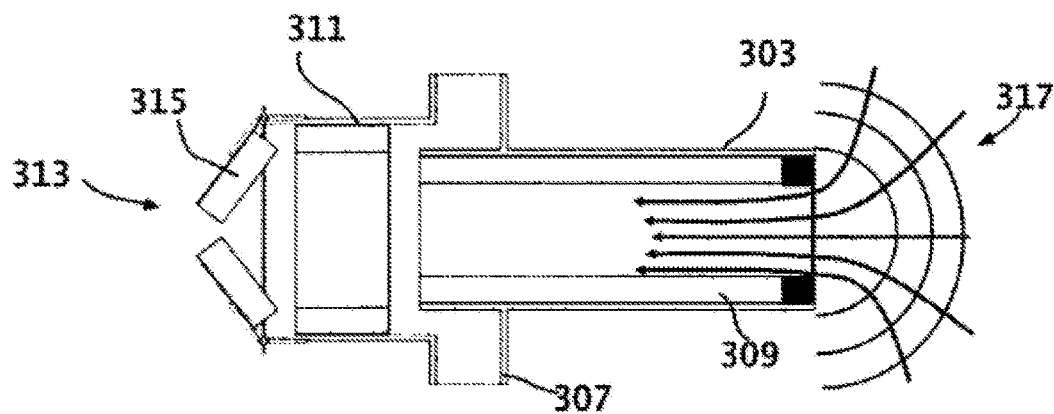
Figure 21:
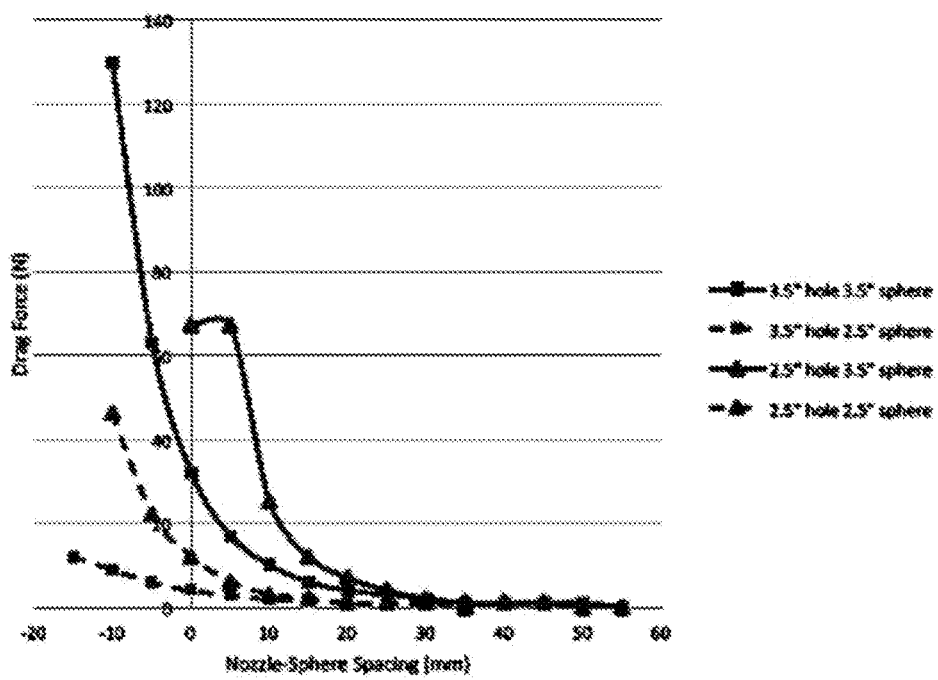

When the vacuum source is coupled, a region of 'ingestion' consisting of a flow field is created where the air-flow increases with proximity to the nozzle, shown as 317 in FIG. 20. The distal portion of this flow field is capable of inducing forces on a fruit sufficient to move the fruit closer toward the nozzle, at which point the fruit moves into a region of higher air flow and substantially higher forces sufficient to separate the fruit from the plant. FIG. 21 illustrates experimental data relating the spacing of the nozzle from the fruit to the drag force on a test object with different nozzle orifice (referred to as 'hole') sizes. The term 'Nozzle-Spacing" refers to the spacing between the front surface of the nozzle and the front-most point on the fruit surface.

The nozzle may be constructed from a rigid material, a flexible material or a combination of both. If the nozzle is constructed of a flexible material, the rigid tube may be large enough such that the fruit may pass through both the nozzle and the rigid tube. If made from a rigid material, the nozzle orifice size may be actively or passively modified to control airflow as well as allowing the fruit to pass through the tube. This may be done in several ways.

Figure 22:
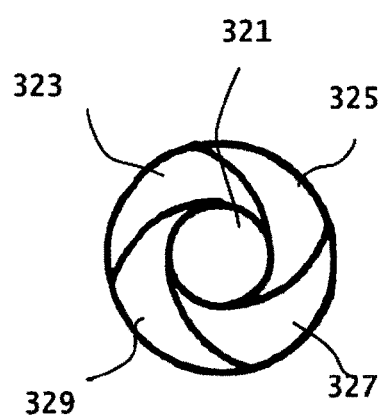
FIGS. 22-23 show an embodiment of an iris opening mechanism.
Figure 23:
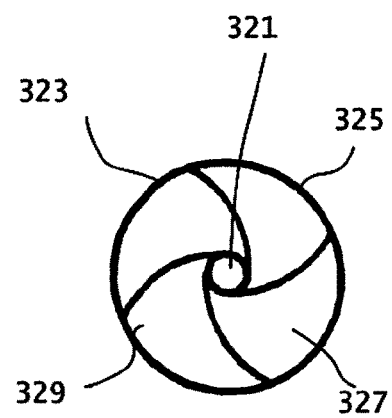

In one technique, an iris opening mechanism may be provided. FIGS. 22 and 23 show an iris opening mechanism. In this mechanism, multiple plates such as 323, 325, 327, and 329 may be arranged as shown so that the size of opening 321 may be adjusted. FIG. 22 shows the opening 321 as larger, and FIG. 23 shows it as smaller. Motors or other actuation mechanisms may be mounted on the body of the end-effector so that the position of the plates and thus the size of the opening may be modified. The actuation mechanism is not illustrated.

The ability to allow fruit to pass through the rigid tube may remove the need to conduct a separate set of "place" motions. Instead, a conveyor system may be coupled to the proximal end of the rigid tube and may enable the end-effector to immediately move to the next "pick" location. This is advantageous as the impact of the place motion on harvesting speed may be reduced or eliminated. The conveyance and system-level topics will be discussed further.

Figure 24:
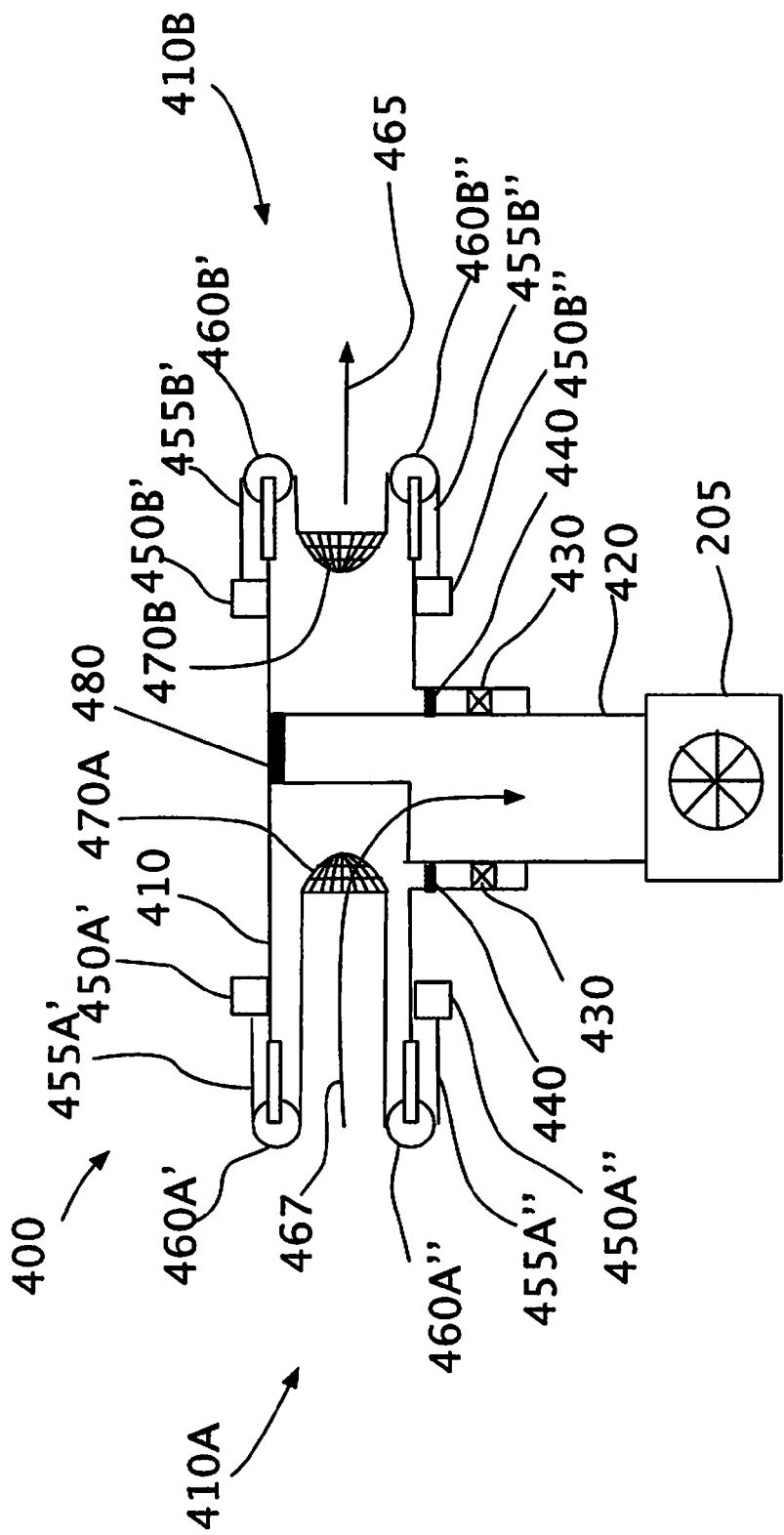
FIG. 24 shows another embodiment of an end effector.
Figure 25:
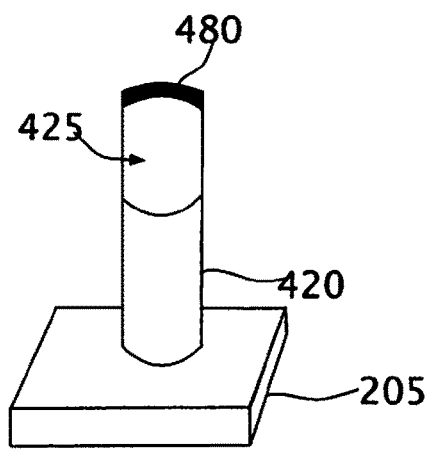
FIGS. 25-26 show embodiments of an inner tube of a vacuum harvesting system.
Figure 26:
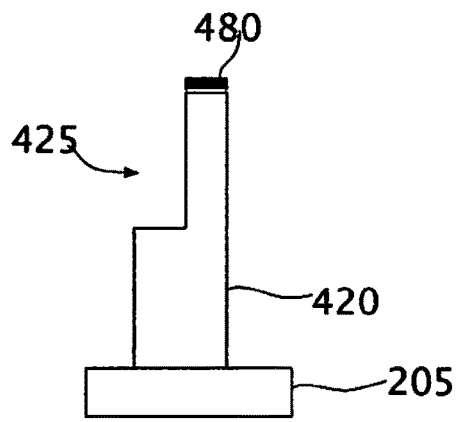
Figure 27:
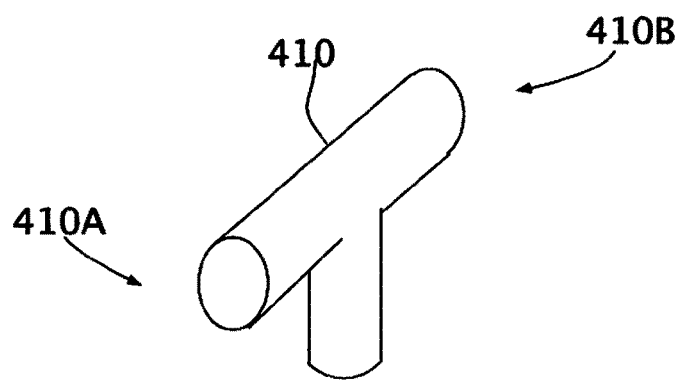
FIG. 27 shows an embodiment of an outer tube of a vacuum harvesting system.

FIGS. 24-27 show another concept of a vacuum based end effector. Here a T-shaped tube 410 may rotate around an inner tube 420. Bearings between the inner tube and the outer tube may achieve this rotation, as illustrated by 430 in FIG. 24. As shown in FIG. 24, each end of the T-shaped tube 410 is labeled uniquely as 410A and 410B. The inner tube around which the outer tube rotates around may have a vacuum generating subsystem 205 coupled at one end. The other end of the inner tube may open into the outer tube as described below. For clarity of description, the inner tube 420 is shown in isolation in FIGS. 24 and 26. FIG. 25 shows a front perspective view and FIG. 26 shows a side view of the inner tube 420. From these Figures, it may be seen that the inner tube 420 may be described as a half cylinder on top of a full cylinder. Also for clarity, the general shape of the outer tube without the end effector members illustrated in FIG. 124, is shown in FIG. 26. When either of the ends 410A or 410B aligns with the half cylinder such that the half cylinder opens into one of the ends, that end will experience a vacuum. Thus referring to FIG. 24, the half cylinder is illustrated opening into end 410A and the path of the vacuum is illustrated by arrow 467. The wall of the half cylinder may cut off the vacuum from reaching the opposite end of the T-shaped tube, end 410B and it may experience no vacuum.

Each end of the T-shaped outer tube may be coupled to a catch net, shown as 470A and 470B. The catch nets may couple to pulleys to allow control of the position of the catch nets inside the tube. Catch net 470A may couple to pulleys 460A' and 460A" by soft strings or cables 455A' and 455A". Similarly catch net 470B may couple to pulleys 460B' and 460B" by soft strings or cables 455B' and 455B". The soft cables or strings 455A', 455A", 455B' and 455B" may couple to motors with a take up mechanism. The Figure shows the motors and the take up mechanism by boxes 450A', 450", 450B', 450B".

In operation, the catch-nets alternate between catching or capturing the fruit and releasing the fruit. This is explained in relation to the position of the outer tube seen in FIG. 24. In this Figure, end 410A of tube 410 experiences vacuum due to alignment of this end to the open face of the half-cylinder. For reference, this position of tube 410 may be called the starting position. As the fruit detaches from the tree, it may travel into the tube 410 and be captured by the catch-net 470A. During this time, as stated before, tube 410 may be rotating around inner tube 420. As the outer tube rotates and the opening of end 410A begins to get occluded by the wall of the half-cylinder, the vacuum decreases. When end 410A and 410B are in diametrically opposite locations from their starting positions, end 410A may be open to the atmosphere while end 410B may now be experiencing a vacuum force. Motors 450A' and 450A" may now activate to eject the fruit from the catch-net by bringing the fruit forward towards the opening of the tube. Meanwhile another fruit may be plucked by end 410B' due to the vacuum existing at this end. Each end of the tube 410 may alternatively pluck the fruit and eject the fruit.

FIGS. 24-27 also show some other variations. Seals 440 and 480 minimize the unwanted dissipation of vacuum. The end effectors shown in FIG. 24 may also include the mechanisms to twist and rotate the fruit. Pulleys 460A', 460A", 460B' and 460B" may be driven wheels similar to driven wheels 333 shown in FIG. 15. In addition, a set consisting of a flexible projection with electrodes and a freely rotating wheel such as illustrated in FIG. 15 may couple to the ends 410A and 410B orthogonal to the axis joining 460A' and 460A" and 460B' and 460B" of FIG. 24.

Figure 28:
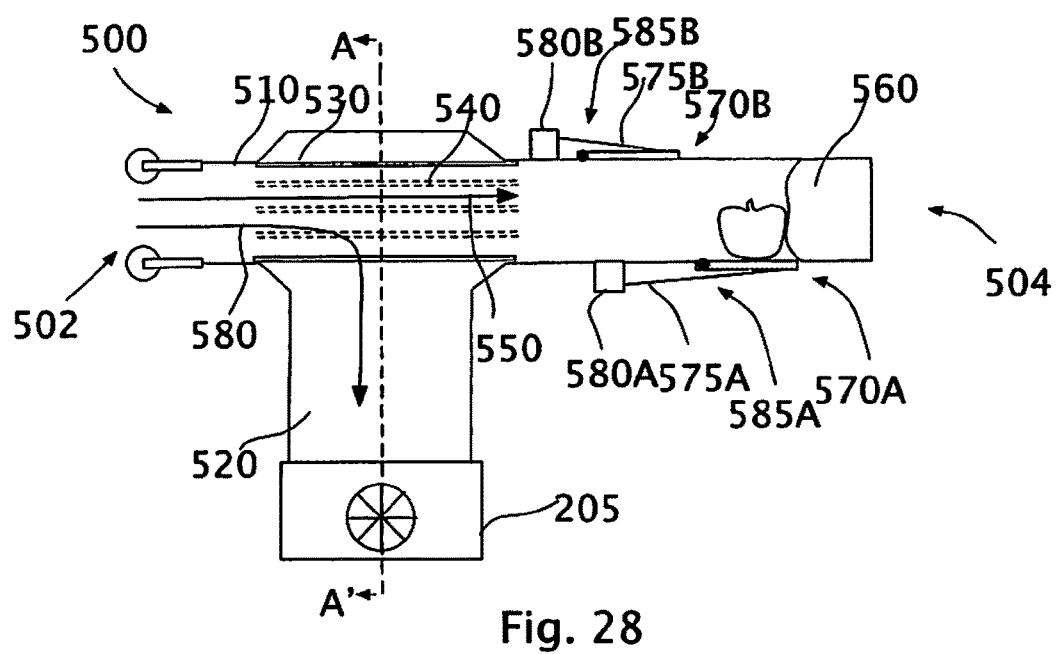
FIG. 28 shows an embodiment of a vacuum harvesting system having a transportation mechanism.
Figure 29:
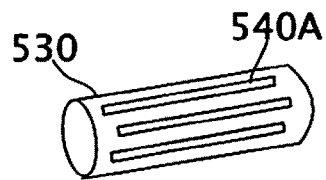
FIGS. 29-30 show embodiments of barrels usable in a vacuum harvesting system.
Figure 30:
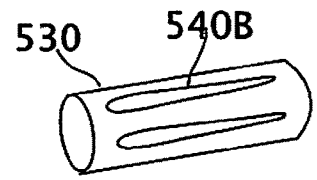

With the system described in FIGS. 24-27, it may be possible to increase the speed at which fruits may be plucked and disposed of. The description of the concepts so far has been limited to vacuum based end effectors designed to pluck fruits. Additional concepts will now be described to include mechanisms that may make further steps of the harvesting process more convenient. One such concept of a system that combines a vacuum based end effector for plucking and a mechanism to transport the fruit to a conveyance system is illustrated in FIGS. 28-32. In FIG. 28, two tubes 510 and 520 generally provide the overall structure for the system 500. These two tubes may couple generally perpendicular to each other as shown in FIG. 28, although other angles between the two tubes is possible. As before, one end of tube 510, labeled 502, may be used to detach the fruit from the tree. The other end, labeled 504, may have a fruit arrestor 560.

The function of the fruit arrestor will be explained further below. However, the presence of the fruit arrestor implies that only one end of tube, end 502, opens to the atmosphere. The path of air flow then may be predominantly along arrow 580 as 205 may be a vacuum generation sub-system. To prevent the fruit from falling into tube 520, a barrel 530 with slit holes 540 may be placed at the T-junction between tube 510 and 520. Barrels with various shapes of slit holes are illustrated separately in FIGS. 29 and 30 for clarity. In FIG. 28, the slit holes are shown by dashed line for clarity. The function of barrel 530 is to provide a path of air along arrow 580 but prevent the fruit from falling into the tube 520.

Figure 31:
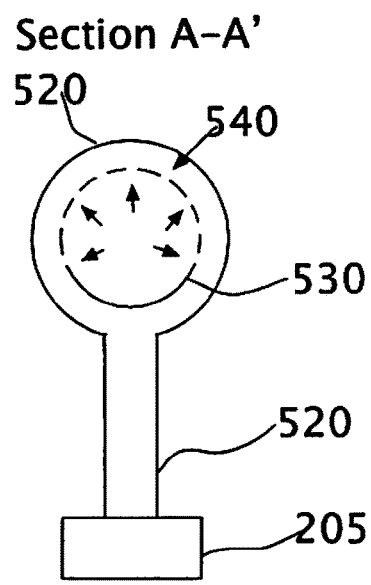
FIG. 31 shows a side view of a vacuum harvesting system having a transportation mechanism.
Figure 32:
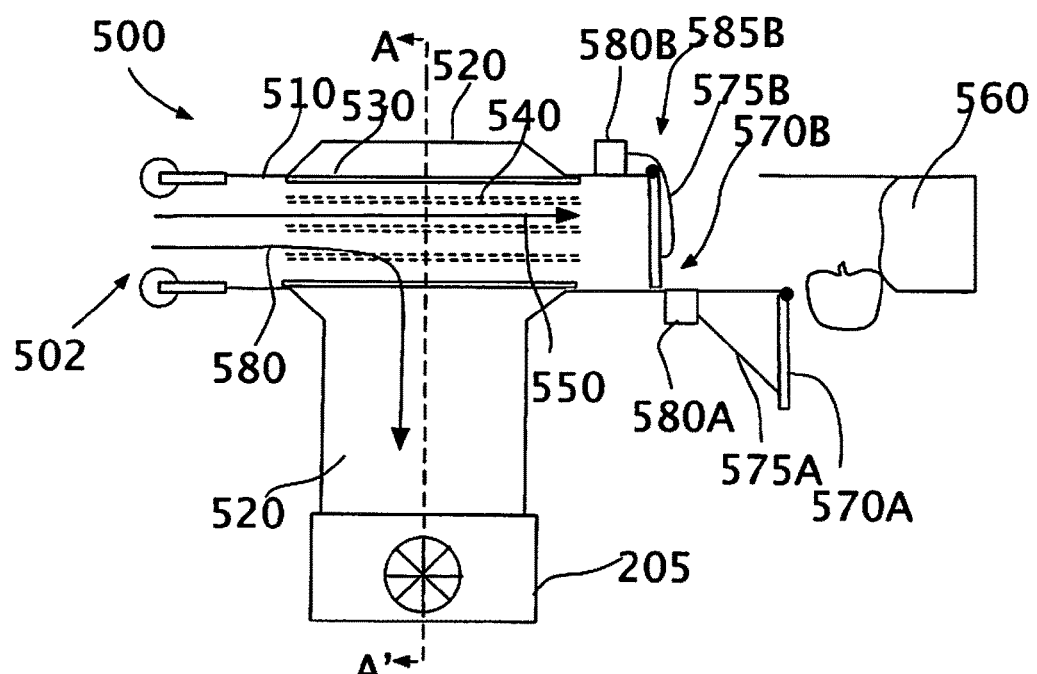
FIG. 32 shows an embodiment of a valve in operation to release fruit.

To aid the passage of the fruit through the barrel, tube 520 may surround tube 510. FIG. 32 shows this figure in a cross-section of the system 500 along the plane A-A'. Referring to FIG. 31, barrel 530 is seen surrounded by tube 520. As show in FIG. 32, tube 510 opens to the atmosphere at least on one end, and the small arrows inside the cross section view of the barrel indicate air flow from the inside of the barrel to the tube 520. As illustrated in FIG. 31, the bottom of barrel 530 may not have the slits. Due to this arrangement of the slit holes, the forces on the fruit may be such that it does not get dragged down towards tube 520. Instead, the fruit may experience a net upward force due to the vacuum. The upward force may be able to balance or at least minimize the gravitational force so that the passage through the barrel may be achieved. Once the fruit detaches from the tree, it may travel straight along arrow 550 from FIG. 32 towards end 504.

In order to prevent damaging the fruit as it travels towards end 504, it may be decelerated. Several techniques may be employed to decelerate the fruit. One such technique is illustrated in FIGS. 28 and 32. In this technique a fruit arrestor is coupled to end 504 in FIG. 28. The fruit arrestor may be a soft balloon or soft netting or some other similar soft material that can travel with the fruit while decelerating the fruit. Another technique to decelerate may be to place a valve past the barrel 530 towards end 504 and opening the valve so that the fruit may experience a head-on force due to air flow from this valve towards the tube 520. This technique is not described in the Figures.

Even more alternate methods may be used to decelerate the fruit. Returning back to FIG. 32, once the fruit has decelerated or perhaps stopped moving, the next task may be to remove it from the inside of tube 510. There are various ways to accomplish this as well. One method is illustrated in FIGS. 28 and 32. FIG. 28 shows two valves or gates 570A and 570B. Each valve may couple to the tube 510 by a hinged joint. Valve 570A may be couple via a hinged joint 585A and valve 579B may couple via a hinged joint 585B. Additionally, the valves may also couple to motors or actuators to control the position of the valve. Valve 570A may couple by a link mechanism 575A to a motor such as a small stepper motor depicted by 580A.

Valve 570B may couple by a link mechanism, cable or a string 575B to a motor such as a small stepper motor depicted by 580B. Valve 570A may couple by a link mechanism 575A as opposed to a cable or a string as the link mechanism may push the valve up against gravity to shut the valve. In contrast, gravity may cause the valve 570B to open and tension on the cable 575B may close the valve. However in general, control of the tension in the link mechanism 575A and the string or cable 575B will control the position of the valves. FIG. 32 shows how the fruit may be removed from the tube once it is arrested. Valve 570B may be allowed to rotate so that it cuts off the vacuum to the tube 510 towards end 504. Meanwhile, valve 570A may be rotated such that it opens, letting the fruit fall. After the fruit exits the tube 510, both valves are shut so that the process may be repeated.

Although FIGS. 28 and 32 illustrated two separate controls and actuator units, variations of the system described above may include just one actuator or motor with only one cabling mechanism controlling both valves. As an example, motor 580B may control a single cable routed between it, valve 570B and valve 570A. By lowering the tension in that one cable, both valves may open. By increasing the tension in the cable, both valves may close. Although not shown in the Figures, the fruit may drop into various locations of conveyance mechanisms. For example, it may drop into a basket or it may drop onto a conveyor belt. Alternatively, it may also drop into a tube that may have its own vacuum system to direct the fruit to a desired location.

It may thus be seen that the system in FIGS. 28-32 advantageously plucks a fruit and delivers the fruit for further processing. In a variation of the concept illustrated in FIGS. 28-32 the vacuum based end effector coupled to end 502 may also include a mechanism to rotate and twist the fruit; these mechanisms were described earlier and will not be described again. In another variation, sensors and a control system may be included as part of the system. The sensors may regulate the vacuum such that a fruits are not plucked if the previous fruit is still in the tube 510. The speed of fruit plucking and dispatching may be optimized.

Figure 33:
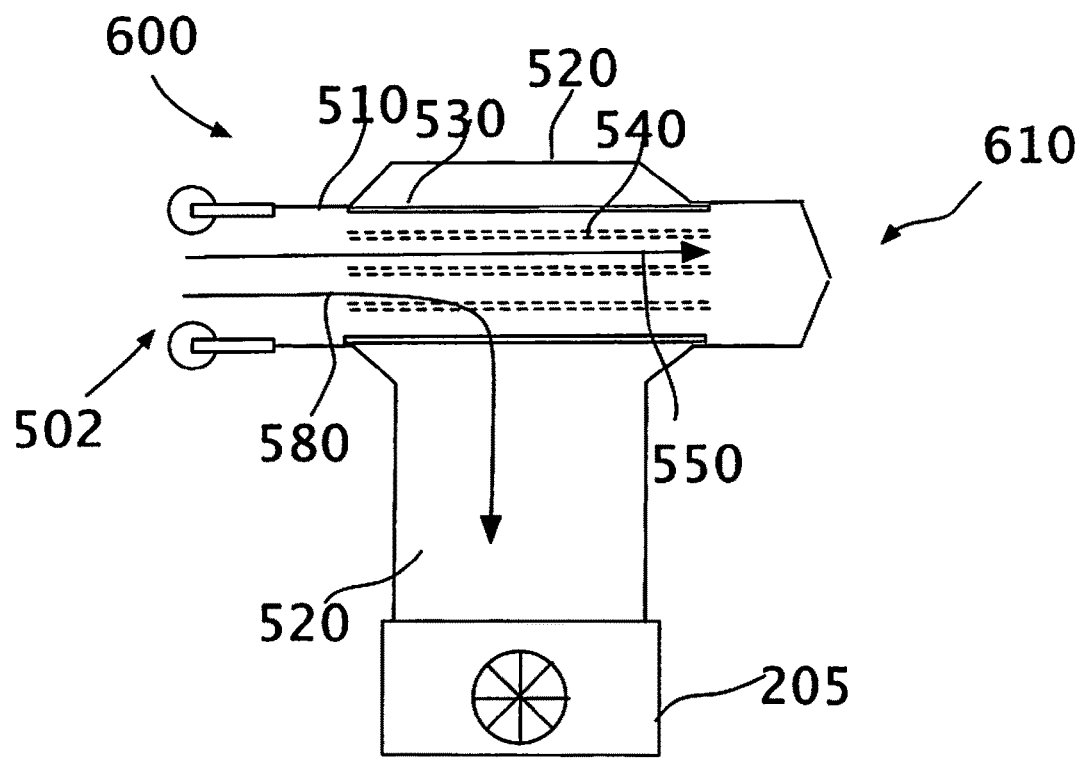
FIG. 33 shows an embodiment of a vacuum harvesting system with a transportation mechanism.
Figure 34:
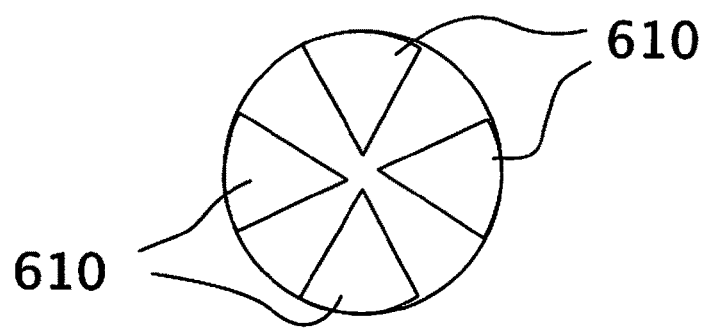
FIGS. 34-35 show embodiments of a flexible flap usable in a vacuum harvesting system.
Figure 35:
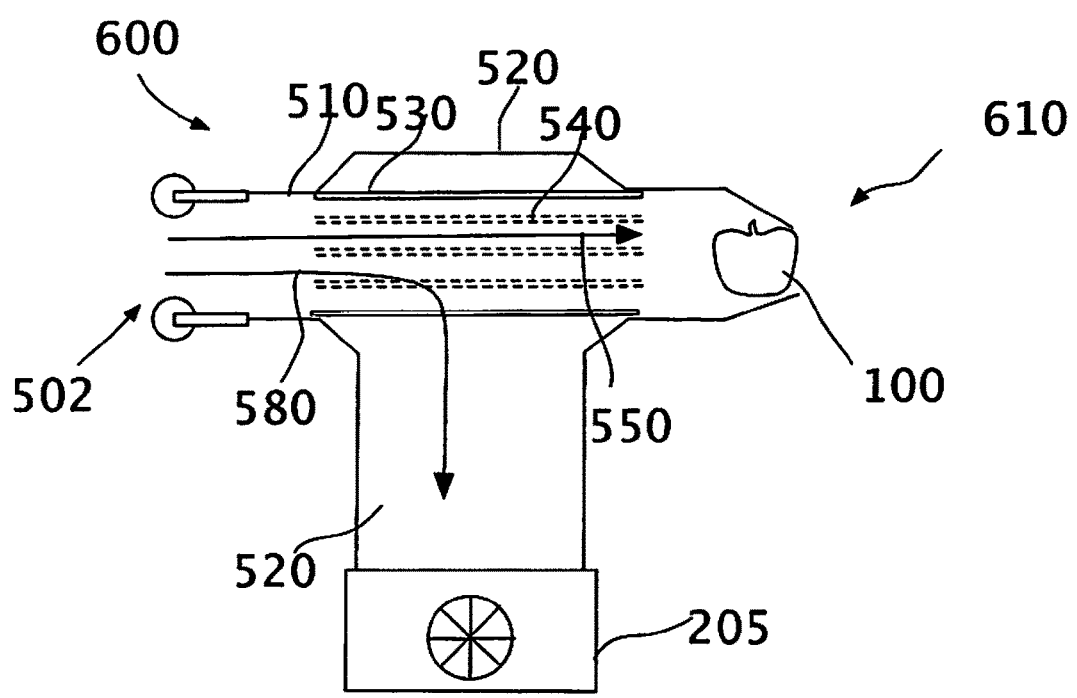

Another concept that combines a fruit plucking system and a transportation mechanism is illustrated in FIGS. 33-35. The system 600 in these figures is very similar to the system 500 in FIGS. 28-32. The difference between the two systems is related to how the fruit is transported to a further conveyance mechanism (the conveyance not shown in the figures). Instead of the valves and the fruit arrestor of system 500, the system 600 in FIGS. 33-35 has a flexible flap mechanism 610.

The flexible flap mechanism is illustrated by itself in FIG. 34. The stiffness of these flaps may be chosen in such a manner that they don't damage the fruit while decelerating the fruit and providing a passageway for the fruit to pass through the tube 510. FIG. 34 illustrates how the flaps may open and let the fruit pass through. The fruit may then pass through to a further conveyance mechanism. After the fruit passes through, due to the vacuum, the flaps may close in such a manner that vacuum dissipation is minimized through the flaps. As before, sensors and a control system may be coupled to the system 600 to ensure that fruit plucking and dispatching steps are streamlined. It may thus be seen from the above discussions how vacuum based end effectors may be used to advantageously detach fruit from a tree without damaging next season's crop.

The conveyance mechanism handles the 'place' portion of a 'pick and place' system. In the current jaw gripper and suction cup systems, the place process requires a time-consuming step of releasing the fruit from the end-effector. The end-effector must move the fruit from its location on the plant to a location where the fruit can be released for subsequent conveyance before harvesting the next fruit.

The ability to allow fruit to pass through the rigid tube may remove the need to conduct a separate set of "place" motions. Instead, a conveyor system may be coupled to the proximal end of the rigid tube and may enable the end-effector to immediately move to the next "pick" location. This is advantageous as the impact of the place motion on harvesting speed may be reduced or eliminated.

Once the fruit has been separated from the tree, the vacuum may accelerate the fruit into the rigid tube. It may then be necessary to remove the fruit from the vacuum environment and decelerate the fruit, in either order. Because high-speed motion of fruits can put the fruits as risk of damage, advantages exist in removing the fruit from the vacuum induced high flow environment immediately after being picked. Decelerating the fruit to a safe speed can occur either before or after the fruit is removed from the vacuum environment.

One way to remove the apple from the vacuum environment is to couple one or more one-way doors at the proximal side of the rigid tube. FIGS. 18-20 illustrate two doors 313. These doors open to allow the fruit to pass through the doors, but otherwise remain closed The system can apply force to maintain the doors closed in the absence of fruit actively with an actuator, or passively with either the consequent force from the vacuum environment or a mechanical spring. Similarly, the system can apply the force to open the doors actively with an actuator, or passively with the momentum of the fruit.

In the case that the moment of the fruit passively open the doors, the fruit must have enough momentum to overcome the force applied to maintain the doors in the closed position. Because momentum increases for a given mass by increasing velocity, it may be desirable to accelerate the fruit to a sufficiently high speed so that it has the momentum to exit the doors. Restricting the airflow around the fruit as it passes through the rigid tube can accomplish this, thereby increasing the vacuum pressure on the fruit and the resulting acceleration and speed. This restriction can apply robustly to the size of a fruit by having a passively or actively adjustable liner inside the rigid tube. The liner could also contain and/or function as a padding. This is illustrated by the hatched lines 309 in FIGS. 18-20. The padding ensures that as the fruit travels along the length of the outer tube, it does not get damaged. Because the impact of the fruit with the doors may cause damage to the fruit, adding a padding to the distal side of the doors may be beneficial. These figures show the padding as 315.

It may also be desirable to minimize the speed of the fruit while ensuring the fruit has sufficient momentum to pass through the doors. The system may accomplish this by minimizing the closing force applied to the doors, such as by minimizing the mechanical spring force, the vacuum force on the doors, or combining springs and vacuum to create a balanced force on the doors to maintain a closed position with very little force.

Figure 36:
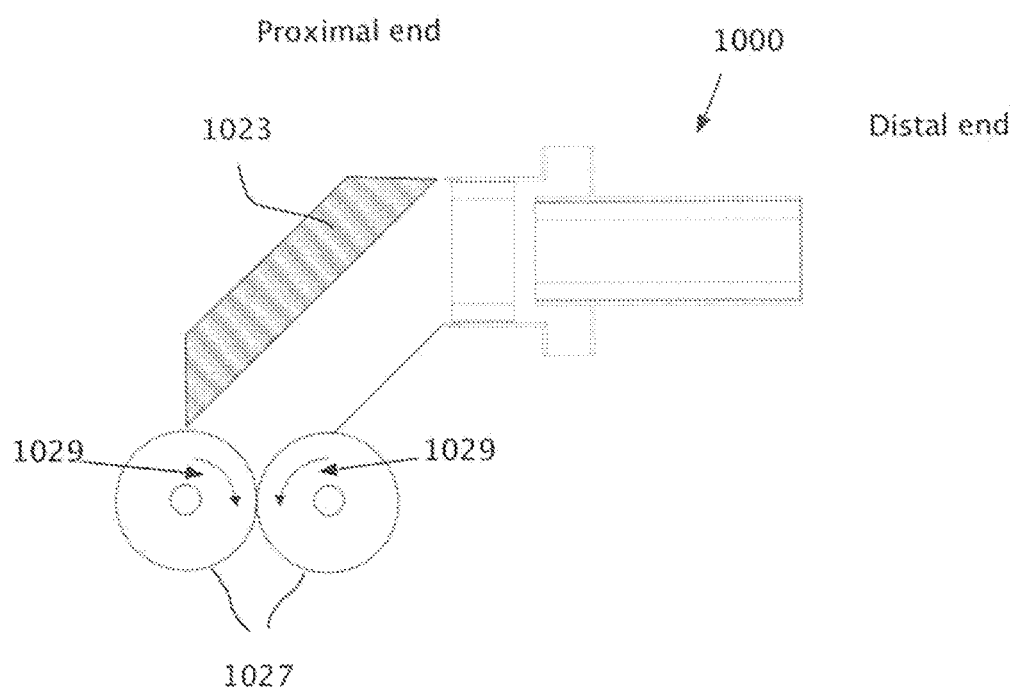
FIG. 36 shows an embodiment of a conduit for moving fruit.

Another consideration lies in the nature of the vacuum escape. The discussion around FIG. 32 addresses one aspect of the vacuum escape after deceleration Another mechanism is illustrated in FIG. 36. Here a padded distal conduit 1023 may be coupled to the distal end of the end-effector. This conduit may have two wheels 1027 whose centers of rotations may be mounted on a mild spring (not shown in the figures). The wheels may be driven shown in the direction of the arrows 1029 by motors (also not shown in the figure). Thus as the fruit hits the padded conduit and falls on the wheels, the wheels part due the mild spring, letting the fruit through. The spring force may be adjusted just so that the fruit is not clasped too tightly but enough to slow the fruit down.

Once the fruit escapes the vacuum environment, it continues to move with a velocity consistent with its remaining momentum. Deceleration is the process of further reducing the velocity to a level that will not bruise the fruit. FIG. 21 described the relationship between the velocity of a Gala apple and the acceleration and when bruises may occur. [From: Lu, L.-X., & Wang, Z.-W. (2007). Dropping bruise fragility and bruise boundary of apple fruit. Trans. ASABE., 50(4), 1323-1329. http://dx.doi.org/10.13031/2013.23609.] This graph may be used as a guide to control the speed of this particular fruit. Other graphs may be used for other fruits. These mechanisms can be integrated directly to the rigid tube, or somewhere between the rigid tube and a remote fixed location.

This can be done passively and simply with materials that have viscous and elastic properties such as but not limited to memory foam. These materials may be chosen such that upon impact, the speed of the fruit may be greatly reduced and may have minimal or no rebound.

This can be done passively with a mechanism like an inelastic catch, such as element 450A in FIG. 24, could be a damper or a passive spring] that is attached to a dissipative element. When the fruit impacts this catch, the catch immediately assumes the velocity of the fruit and the dissipative mechanism slows both the catch and the fruit. This catch can either return to its home position along the same path of deceleration, or can be on a recirculating track or wheel.

This can be done passively with a combination of an inelastic catch and a padding in which the inelastic catch is lined with the padding. Additional details in relation to FIG. 24 of the previous include that element 450A may be a damper or a passive spring. Also, 470A and 470B may be a padded, elastic, rigid or a combination of these properties.

Another technique to decelerate may place a valve past the barrel 530 in FIG. 28 of the previous disclosure towards end 504 and possible also a valve towards the beginning at 502 such that opening the end valve and possible closing the beginning valve changes the direction of airflow creating a decelerating force on the fruit.

Figure 37:
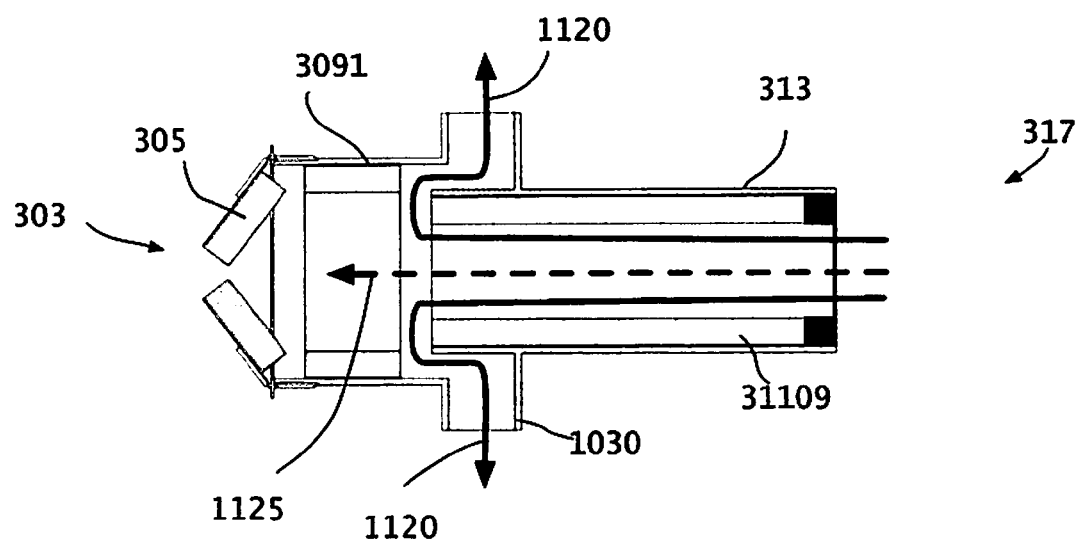
FIG. 37 shows a cross-sectional view of an embodiment of an end effector.

Returning back to the description of the end-effector, FIG. 37 shows a cross sectional view of the end-effector. As described above, the construction of the main tube allows a path for the airflow may be provided from the sides of the tube whereas another proximal path is provided for the fruit. This is illustrated by the arrows 1120 and 1125. Arrows 1120 illustrates the path of the airflow while arrow 1125 illustrates the path of the fruit. The proximal path within the intermediate tube 311 is created to provide a cavity with negligible airflow when the doors are closed, thereby enabling the fruit to move in an approximately uninterrupted path to the deceleration or vacuum escape mechanism. The goal here is to minimize the axial length of the path of the fruit in vacuum in order to minimize the total length of the end-effector. To achieve this, airflow passes to the vacuum port 307 on the sides of the end-effector as indicated by arrows 1120. The fruit, as described above, would follow the path indicated by arrow 1125.

Figure 38:
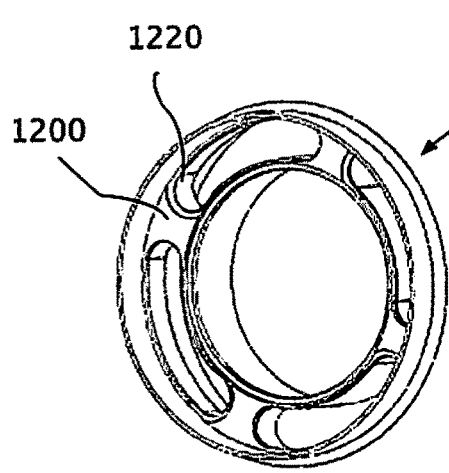
FIG. 38-40 show an embodiment of a twig cutter.
Figure 39:
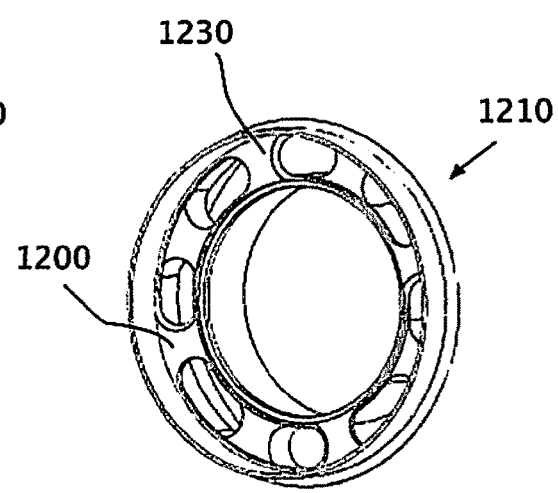

Another feature called the twig cutter is now described. Referring to FIG. 37, the airflow is illustrated by the solid arrows 1120. In addition to fruit, debris such as twigs may be vacuumed in. As the twigs are of relatively smaller mass, they may follow the path of the solid arrows and get stuck at the junction of the intermediate tube and outer tube where the arrows make a U-turn. Over time, this will reduce the effectiveness of the vacuum. To avoid this, a twig cutter is included and is now described. The twig cutter is described in FIGS. 38-40. The twig cutter consists of two wheels, one of which rotates with respect to the other. Both wheels have features that are cut within their bodies; these features serve as opposing blades. As the wheels rotate with respect to the other, the blades cut the twigs reducing the obstruction. FIG. 38 shows the wheels as 1200 and 1210. In this example, wheel 1200 can rotate with respect to wheel 1210. Each wheel has multiple features cut into its body. One such feature is labeled as 1220 on the wheel 1220. In FIG. 39, wheel 1220 has rotated with respect to its position in FIG. 38. The features cut into the wheel 1210 is visible through the feature cut into wheel 1230. For example, feature 1230 on feature 1210 is visible through feature 1220.

Figure 40:
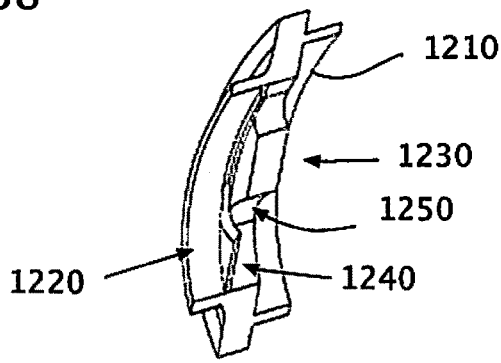

These features may include sharp edges. FIG. 40 shows a section of the wheel 1200 and a section of the feature 1220 having a sharp edge 1240. This figure also shows a section of the second wheel 1210 and its feature 1230 along with the associated sharp edge 1250. With this figure, if twigs get stuck at the intersection of the outer tube and the intermediate tube, by rotating one of the wheels of the twig cutter, the twigs may be cut into smaller pieces. Wheel rotation may be obtained by a motor. The motor is not shown in the figure. This will reduce or negate the impact of reduced vacuum due to clogged airways. Wheel rotation may also be obtained by coupling the wheel to a small turbine through a gearbox.

Although not shown in the figures, the fruit may drop into various locations of conveyance mechanisms. For example, it may drop into a basket; it may also drop on a conveyor belt. Alternatively, it may also drop into a tube that may have its own vacuum system to direct the fruit to a desired location or simply take advantage of gravity to convey the fruit through the tube. These concepts will be described further below.

Figure 41:
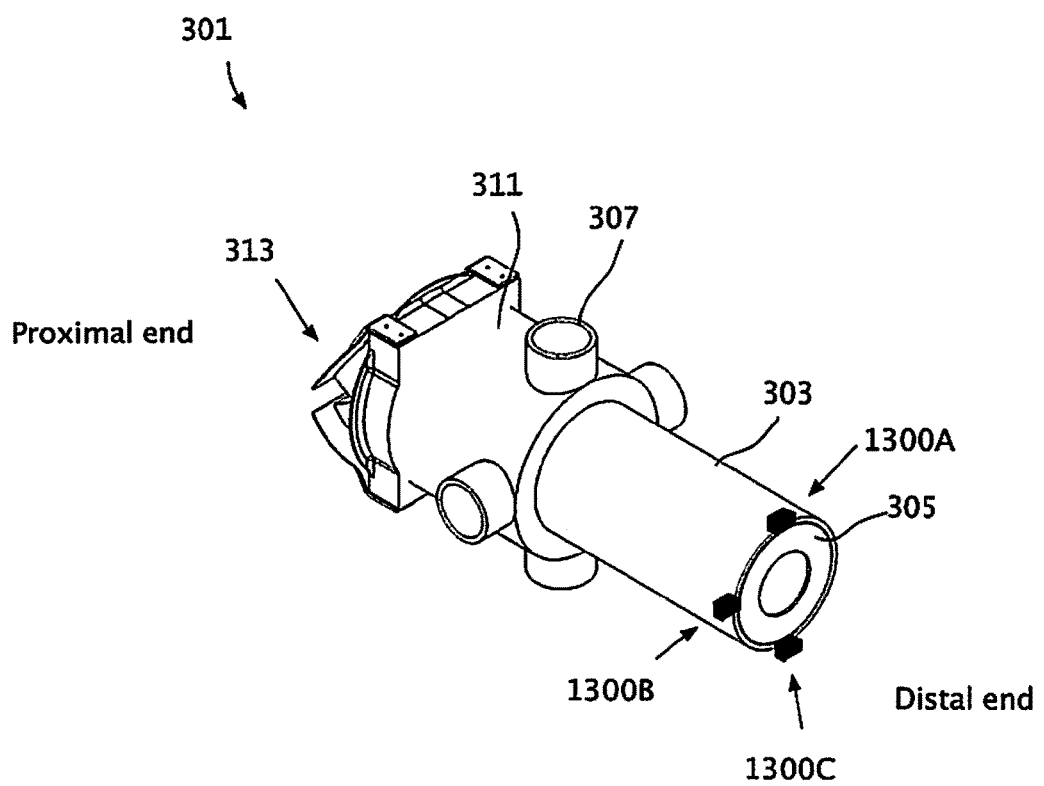
FIG. 41 show embodiments of sensor placement on an end effector.

Sensors, cameras and other electronics, generally termed as 'sensors' may be installed at various locations including but not limited to, along the exterior and the interior of the end-effector. FIG. 41 shows example locations 1300A, 1300B, 1300C where sensors may be coupled to the end-effector. Other locations are not excluded. These electronics may be use advantageously to optimize and improve the performance of the robotic system. These electronics may also be part of a control system that is further explained below. These electronics may include one or multiple cameras, one or multiple proximity sensors, one or multiple contact sensors, one or multiple pressure sensors and one or multiple lights or structured lights may be installed on the end effector.

The cameras may be used to position the end-effectors in an automatic manner. To explain this further, the cameras may be part of a vision system that would process the images, perform object recognition and compute the location of the recognized fruits and send control signals to the actuation mechanisms so that the end-effector can be positioned appropriately near the fruits, one fruit at a time. The software solution can be trained to pick only fruits that are adequately ripe and apparently defect free. It is to be noted that each end-effector can be positioned independently and automatically.

Cameras may also be placed internal to the end-effector in order to capture visual information about multiple sides of the fruits as they pass through the end-effector to evaluate the quality of the fruit.

A proximity sensor may information about the proximity of parts of the tree structure (e.g. branches, trunks, trellis wires, trellis posts, etc.) or the fruits themselves. They may also provide information about the proximity of objects such as but not limited to people. They may also provide information about the location and speed of fruits within the end-effector itself. These sensors may be of various types such as but not limited to optical, magnetic, inductive and acoustic. The information may be used to confirm the estimated location of fruits, as well as avoid objects other than fruits.

A contact sensor may provide information about the alignment of the end-effector to the fruit upon contact, or may provide information about the contact of the end-effector with an object other than the intended fruit. Contact sensors consist of a change in electrical sensor as the result of displacing and or compressing a physical material. Sensor types may be capacitive, inductive, resistive, optical, etc. The information may be useful for adjusting the position of or retracting the end-effector during picking.

A pressure sensor may provide information about the change in pressure in the vacuum environment. Pressure sensors may be capacitive, etc. They may be placed inside the end-effector so as to sense the internal pressure of the end-effector but not come in contact with picked fruits. The information may be used to determine when a fruit has been successfully picked.

Other sensors may be used such as hyperspectral imagers, x-ray, etc. These sensors may enable fruit detection through leaves, or the evaluation of fruit quality based upon internal fruit anatomy.

Figure 42:
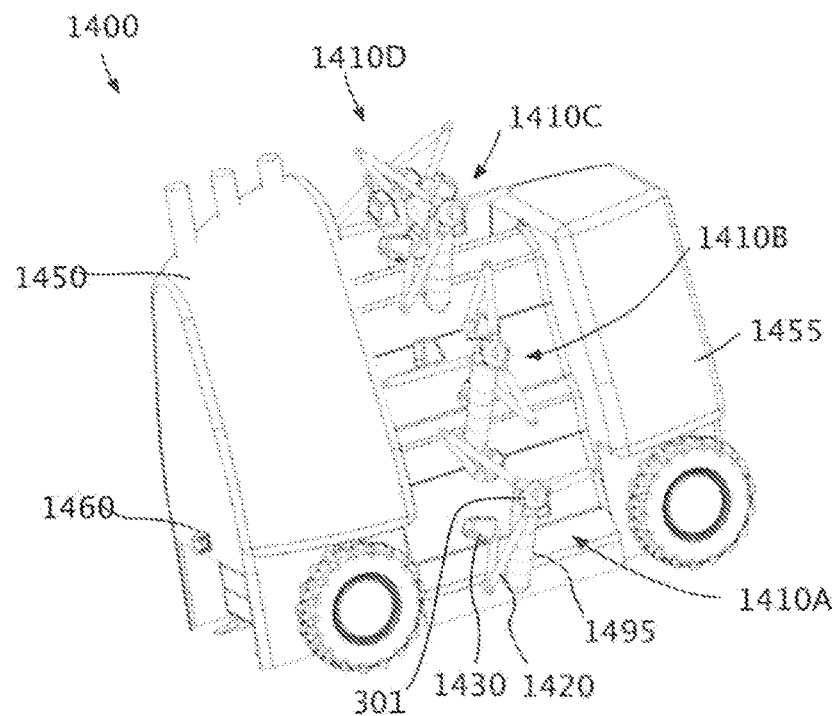
FIGS. 42-43 show an embodiment of an agricultural robot system.
Figure 43:
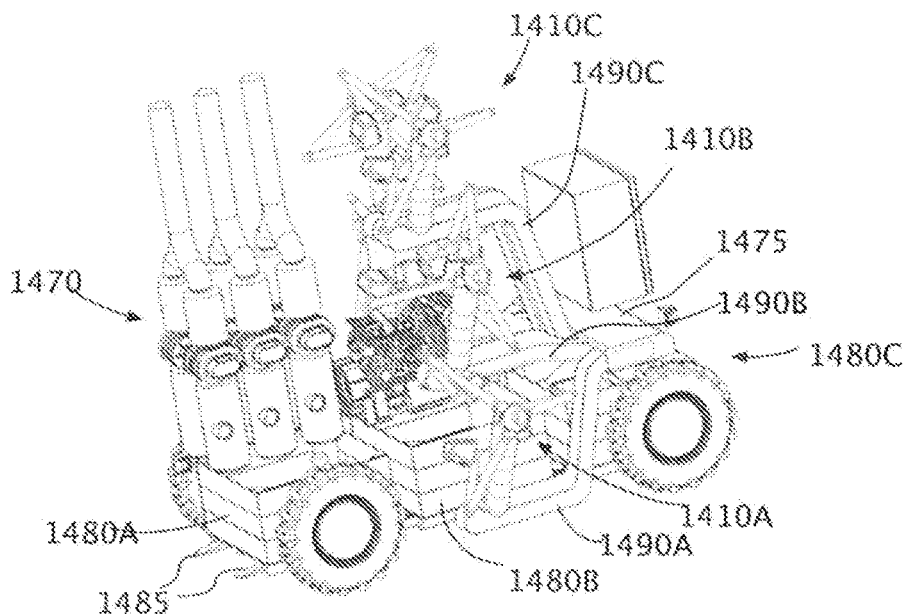

FIG. 42 describes an agricultural robotic system 1400 that uses robot arms to move vacuum-based end-effectors to pick fruits. FIG. 43 provides more details of the agricultural robotic system with some of the mechanical covers taken off.

One or multiple arms with end-effectors and with our without sensors may be mounted on a mobile platform as seen in the figure. The arm systems may be located on both sides of the mobile platform. In the figure, arm systems 1410A, 1410B and 1410C are clearly seen where as 1410D and other arm systems on the opposite side are not clearly seen or not seen at all. The positions and orientations of the arm mounting may be passively or actively adjusted to accommodate variations in architecture. They may be cascaded to prevent apples that fall during picking activities from impacting lower apples. As such, the arms responsible for picking apples at the lowest elevation will be positioned toward the front of the vehicle and arms responsible for picking apples at the highest elevation will be positioned toward the back of the vehicle.

Figure 44:
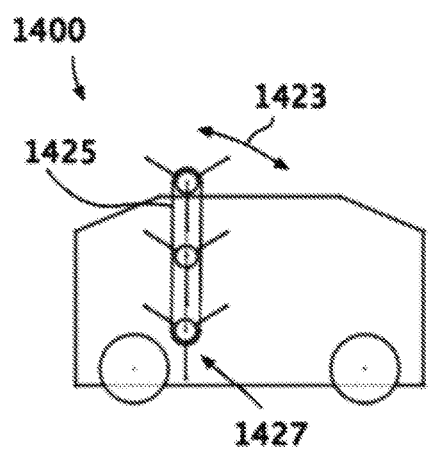
FIGS. 44-47 show another embodiment of an agricultural robot system.
Figure 45:
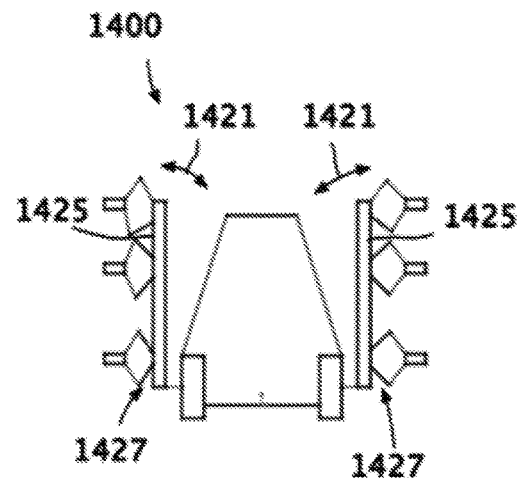
Figure 46:
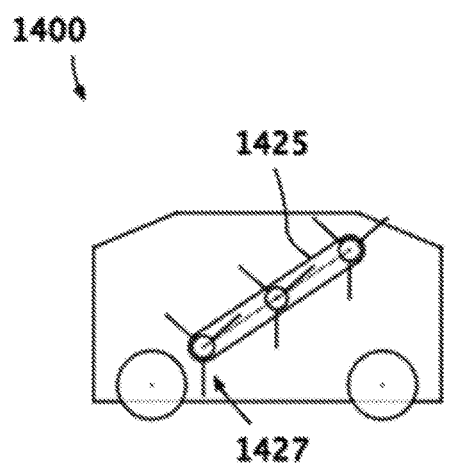
Figure 47:
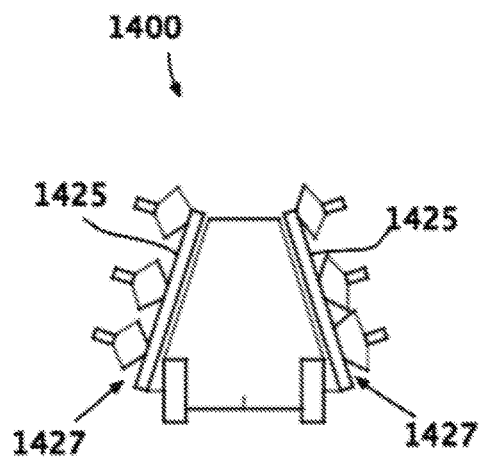

To enable the cascading and to accommodate various canopy shapes, the robotic system may have the capability to modify the angle and the inclination of the arms. FIGS. 44-47 shows this concept. The multiple arm systems may be arranged on a carriage 1425. The carriage may have a two degrees-of-freedom hinge at the location indicated by 1427. In FIG. 44, arrow 1423 illustrates the direction of rotation about one degree-of-freedom. In FIG. 45 arrow 1421 illustrates the direction of rotation about the other degree-of-freedom. FIGS. 46 and 47 illustrate two of the various arm carriage positions possible due to this hinge. With this flexibility, various canopy shapes may be accommodated for.

Figure 48:
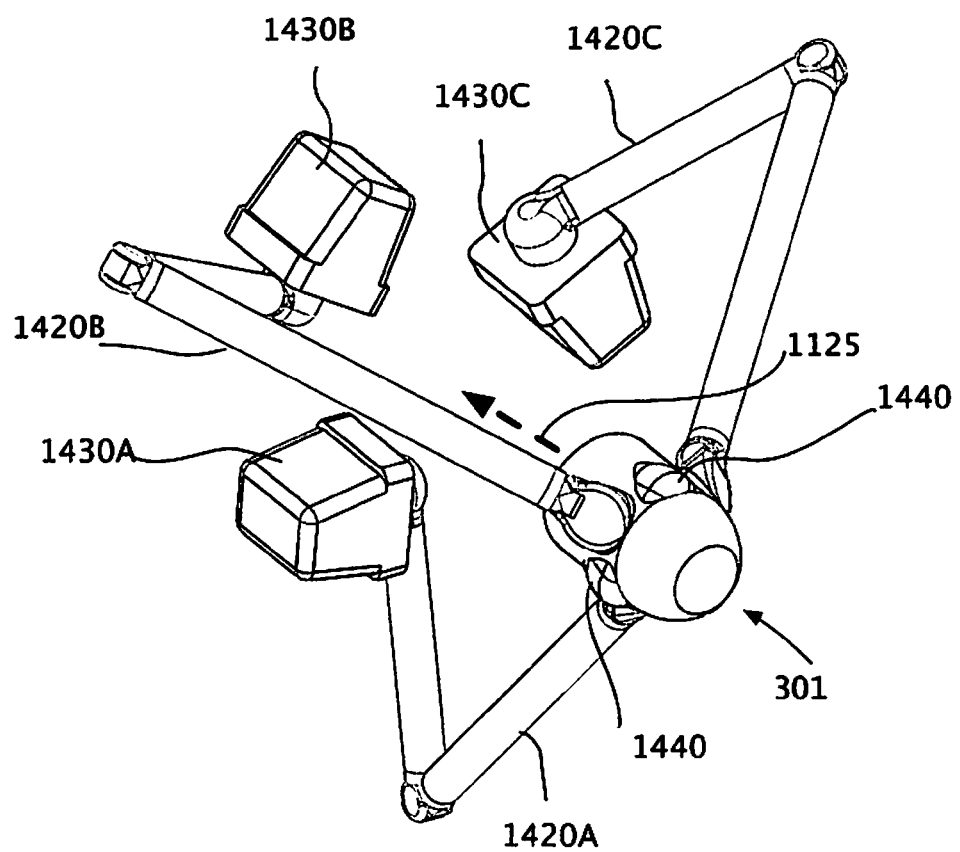
FIG. 48 shows an embodiment of an arm system for an agricultural robot system.

FIG. 48 illustrates the arm system. As can be seen from the figure, the arm system may have multiple arms such as 1420A, 1420B and 1420C. In the figure, although three arms are illustrated, the system may comprise of fewer or more arms. Each arm may be multi-jointed and may be actively driven by actuation mechanisms located on the structure of the mobile platform. The actuation mechanisms are shown by 1430A, 1430B and 1430C. Various types of actuation mechanism may be utilized such as but not limited to motors. Each arm system also may have an end-effector as shown by component 301, discussed in FIGS. 18-20. The end-effectors have been described above. The actuation mechanism permits the positioning of the end-effector so that the end-effector can be brought close to the fruit that needs to be harvested.

In order to provide the end-effectors with vacuum, a vacuum subsystem may be integrated into the robotic system 1400. In order to sustain the desired flow rate of air during the picking event, one possibility is to have separate vacuum blowers for each end-effector. An alternative is to have a single vacuum blower and use valves to adjust vacuum power as a function of the load on the end effectors. The vacuum system may include filters for the collection of leaves, twigs, etc. The vacuum system may also include silencers and exhaust pipes to control the direction of the exhaust airflow.

Vacuum may be provided in several ways to the end-effector. In one figure, the arms of the arm system may be hollow and may have a conduit for the vacuum system. Thus in this example, arms 1420A-1420C may be hollow and provide the conduit. The arms would then couple to the vacuum ports 1030 shown for example in fog. 1002. Alternatively, flexible tubing may be used to convey the vacuum environment to the end effector. In this alternate figure, the vacuum port or ports may be distinct from the coupling mechanism to couple the arm to the end-effector.

In FIG. 43, the covers 1450 and 1455 of FIG. 42 are removed to reveal more details of the robotic system. Various types of engines such as a combustion or an electric engine may be used to power the motion of the robotic system, to power the vacuum subsystem and other subsystems. FIG. 43 shows the engine 1470. The engines may be coupled to multiple vacuum systems in parallel to enable the engine power to flow preferentially to the vacuum system with the largest load. If a combustion engine is used, the engine may also drive an electric generator. Additionally the robotic system may have a fuel tank or batteries or both.

As seen in FIGS. 42 and 43, the robotic system may be mobile. The wheels of this mobility system may be driven or steerable. Wheels may be driven and steered independently our in a coupled fashion.

As mentioned earlier, the plucked fruit needs to exit the end-effector and needs to be deposited to a conveyance mechanism. Several methods may be used to achieve this. In one such method shown in FIGS. 42 and 43, collection tubes such as collection tube 1495 is coupled between the end-effector and a conveyance mechanism. The fruit exits the end-effector and travels through the collection tube and is deposited onto the conveyance system. The conveyance system may consist of a system of conduits and belts that carries the fruit from the harvesters to the storage system. Three such conduits are enumerated as 1490A, 1490B and 1490C. One can see that the conduit 1490A carries fruit harvested by the arm system 1410A and conduit 1410B carries fruit harvested by the arm system 1410A and so on. Each of these conduits may have a conveyor belt that carries fruit from the robotic harvester to the storage system. There are many well-known methods to make a conveyor system and these will not be described here. Ultimately the fruit is transported to a storage system that is now described.

FIG. 43 also shows a bin management system. The bin management system consists of multiple bins such as bin 1480A, 1480B and 1480C. The bins may be located on a bin conveyor 1485. As illustrated in FIG. 43, the fruit conveyor brings the fruit to the last bin—bin 1480C. After the bin is filled by the bin filler, the bin conveyor system 1485 is activated and bin 1480C is released from the robotic system and is set on the ground while the robotic system continues to move forward and harvest more fruit. As the bin 1480C is released from the robotic system, bin 1480B moves into position so that fruit now falls into this bin. The operation repeats itself with each bin filling up and released from the robotic system. Empty bins are placed in front of the vehicle with a spacing appropriate to the spatial rate of bin filling. The bin conveyor picks up the bins as the vehicle comes in contact with them and moves the conveyor along as described. The bins that released and set on the ground are collected at a later time by other resources.

Bin-filler is utilized to move fruit from the conveyor system into the bin without bruising the fruits. FIG. 43 shows the bin filler as component 1475.

In many orchards, the trees may be planted in rows with a path in between the rows. The robotic system may travel down this path. Since the robotic system may have arm systems on both sides, the robotic system may need to be centered on the path. Sensors may be used for this purpose, to detect the tree canopy and determine where the mid-plane between the two canopy surfaces is. Sensors that may be used for this purpose may include LIDAR, cameras, non-contact and contact proximity sensors, etc.

Sensors to sense the speed of the vehicle may be included in the robotic system. Sensors for this purpose can include GPS, wheel rotational displacement measurements (e.g. optical encoders), optical flow from cameras or other sensors, etc.

It may also be advantageous to know the location of fruits in world coordinates. Coupling the image data from the vehicle with a GPS sensor can provide this information.

It may also be advantageous to know the dynamic or oscillatory behavior of the system in order to provide compensating motions with the robot arm, thus ensuring the ability of the end-effector to be placed at the desired location despite motions of the base of the robot.

Camera sensors at the front of the vehicle, can provide an initial picture of the canopy for pre-planning of the picking motion strategy. Sensors in the machine that observe fruits as they are conveyed can be used to determine the quality of the fruit. Sensors such as load cells may be integrated into the bin conveyor in order to determine the mass of the bin.

Sensors such optical proximity sensors may be integrated into the bin filler to determine the fill height of the bin. Sensors such as cameras or LIDAR in the front and back of the vehicle may be integrated to anticipate the arrival and left-right position of an empty bin to the vehicle and the successful departure of a full bin. Sensors such as cameras or LIDAR in the front and back of the vehicle may be integrated to detect the presence of persons or animals.

When the robotic system reaches the end of a row of trees, the system should either stop or navigate to the next row of trees. Sensors such as GPS, LIDAR and cameras may be included to achieve this functionality.

Figure 49:
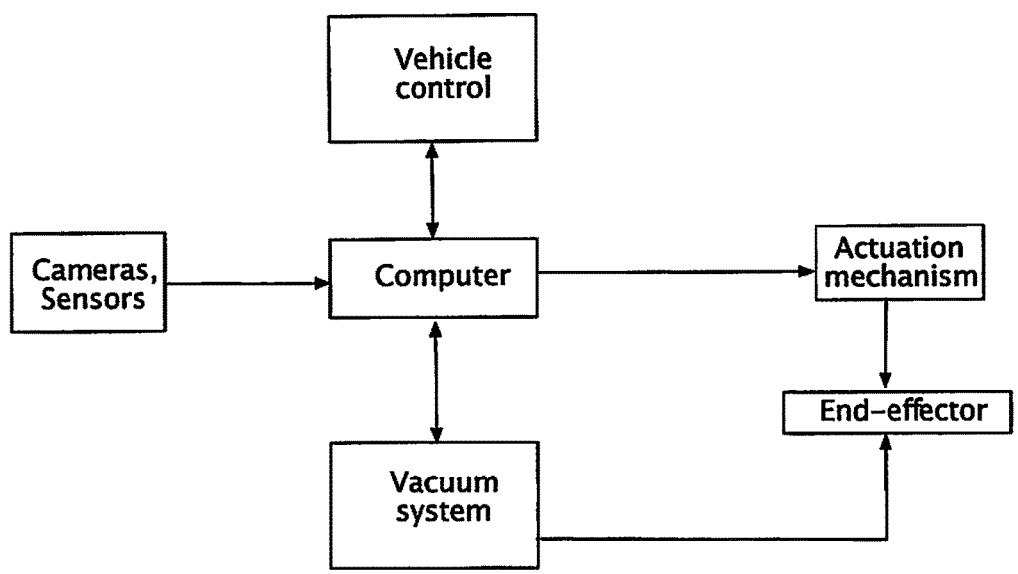
FIG. 49 shows a block diagram of a control system.

An overview of the control system is illustrated in FIG. 49. Many elements of the control system have been described above. The control system may consist of a computer or some other alternative computing resource. The computer may send control signals to the vacuum system and the vehicle control system. It may also send control signals to the actuation mechanism that controls the position of the end-effector. As shown in the Figure, the control system may receive signals from various sensors and cameras located in various locations throughout the robotic system. Using the images from cameras for example, the control system may calculate desired positions of the end-effector. The images may also be used to avoid obstacles such as but not limited to the branches, trellis wire and trellis posts.

In addition to using information received from cameras, the control system can use information from sensors such as proximity sensors to achieve precise positioning of the end-effector. As an example, the proximity sensor may be utilized to modulate the speed at which the end-effector approaches a fruit so that damage to the fruit is minimized Thus as an end-effector approaches the fruit, the proximity sensor may send signals to a control system which would consequently send control signals back to the actuation mechanisms and modulate the speed with which the end-effector approaches the fruit.

As noted above, the control system may send control signals to the vacuum system based on signals it gets from various sensors so that the vacuum pressure and therefore the speed of harvesting can be adjusted or modified. As described previously, if the fruit is being harvested too quickly, the vacuum pressure may be reduced so that fruits are not plucked as quickly. The need to adjust the vacuum pressure may be triggered by other factors such as but not limited to presence of moisture on some fruit and not on others, differences in fruit size from tree to tree, differences in the ripeness. The sensors or cameras integrated within the path of the fruit vacuum system may take images of the fruit and assess the quality or other characteristics of the fruit. Based on this information the vacuum pressure may be adjusted. With the control system and the system of cameras and sensors, the vacuum pressure may be adjusted on a real-time basis as well.

In a further concept, the control system may also control the movement of the vehicle based on the harvesting action. For example, the control system may calculate the best position of the vehicle in relation to the tree so that the fruit from one tree may be harvested in as few adjustments of the vehicle location as possible. By doing this, the throughput may be improved.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An automated, robotic fruit harvesting system, comprising:
at least one sensor to locate fruit on a tree;
a vacuum system;
a robotic arm;
an end effector movable by the robotic arm, wherein the end effector comprises: (i) a rigid tube comprising a distal end, a proximal end, and a connection to the vacuum system to create an air flow through at least a portion of the rigid tube, wherein the connection to the vacuum system is located between the distal end and the proximal end; (ii) a nozzle at the distal end of the rigid tube, the nozzle comprising an orifice through which the air flow can separate a fruit from a tree and pull the fruit into the nozzle and the rigid tube; (iii) a deceleration structure within the rigid tube to slow fruit accelerated by the vacuum system; and (iv) a closable opening at the proximal end of the rigid tube to allow removal of the fruit from the end effector; and
a control system configured to receive signals from the at least one sensor and provide control signals to automatically position the end effector with a spacing between a front surface of the nozzle and the fruit on the tree such that the air flow created by the vacuum system separates the fruit from the tree and pulls the fruit into the nozzle and the rigid tube.

2. The system of claim 1, further comprising a liner inside the rigid tube.

3. The system of claim 2, wherein the liner is adjustable.

4. The system of claim 2, wherein the liner comprises padding.

5. The system of claim 1, wherein the connection to the vacuum system comprises slits in the rigid tube.

6. The system of claim 1, wherein the sensor comprises at least one camera.

7. The system of claim 1, wherein the sensor comprises at least one proximity sensor.

8. The system of claim 1, wherein the deceleration structure comprises a material having viscous and elastic properties to allow the fruit to impact with no damage to the fruit.

9. The system of claim 1, wherein the deceleration structure comprises dissipative elements attached to a catch.

10. The system of claim 9, wherein the dissipative element is a damper or passive spring.

11. The system of claim 9, wherein the dissipative element comprises padding.

12. The system of claim 1, wherein the deceleration structure comprises a valve to change a direction of air flow to create a decelerating force on the fruit.

13. The system of claim 1, wherein the closable opening comprises an opening having doors.

14. The system of claim 13, wherein the doors comprise passive opening doors that open upon contact with physical structure.

15. The system of claim 13, wherein the doors comprise active opening doors.

16. The system of claim 1, further comprising a conveyor coupled to the closable opening to transport the fruit away from the end effector.

17. The system of claim 16, wherein the conveyor includes padding.

18. A method of harvesting fruit, comprising:
receiving, at a control system, signals from at least one sensor and providing control signals from the control system to an actuation mechanism to automatically position an end effector attached to a robotic arm driven by the actuation mechanism, the end effector comprising (i) a rigid tube comprising a distal end, a proximal end, and a connection to a vacuum system to create an air flow through at least a portion of the rigid tube, wherein the connection to the vacuum system is located between the distal end and the proximal end, (ii) a nozzle at the distal end of the rigid tube, the nozzle comprising an orifice through which the air flow can separate a fruit from a tree and pull the fruit into the nozzle and the rigid tube, (iii) a deceleration structure within the rigid tube to slow fruit accelerated by the vacuum system, and (iv) a closable opening at the proximal end of the rigid tube, to position the end effector with a spacing between a front surface of the nozzle and the fruit on the tree such that the air flow created by the vacuum system separates the fruit from the tree and pulls the fruit into the nozzle and the rigid tube;
decelerating the fruit by the deceleration structure; and
removing the fruit from the end effector via the closable opening.

* * * * *